US008848728B1

(12) United States Patent
Revah et al.

(10) Patent No.: US 8,848,728 B1
(45) Date of Patent: Sep. 30, 2014

(54) DYNAMIC LOAD BALANCING SWITCH ARCHITECTURE

(75) Inventors: Yoram Revah, Akko (IL); Aviran Kadosh, Misgav (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 415 days.

(21) Appl. No.: 13/081,458

(22) Filed: Apr. 6, 2011

Related U.S. Application Data

(60) Provisional application No. 61/322,247, filed on Apr. 8, 2010.

(51) Int. Cl.
H04L 12/54 (2013.01)
H04L 12/50 (2006.01)
H04W 72/00 (2009.01)

(52) U.S. Cl.
USPC .................... 370/429; 370/386; 455/453

(58) Field of Classification Search
CPC ........ H04W 72/00; H04L 12/50; H04L 12/54
USPC ......... 370/400, 428, 429, 351, 353, 354, 470, 370/474, 485–487, 395.21, 468, 395.4, 370/395.42, 471–473, 389, 388, 390, 392, 370/384, 385, 386, 387, 426
See application file for complete search history.

(56) References Cited

U.S. PATENT DOCUMENTS

| | | | |
|---|---|---|---|
| 6,337,862 B1 | 1/2002 | O'Callaghan et al. | |
| 6,711,163 B1 | 3/2004 | Reid et al. | |
| 7,636,309 B2 * | 12/2009 | Alicherry et al. | 370/230.1 |
| 8,014,278 B1 * | 9/2011 | Subramanian et al. | 370/229 |
| 8,218,553 B2 * | 7/2012 | Kompella | 370/395.5 |
| 8,270,395 B2 * | 9/2012 | Kompella | 370/353 |

OTHER PUBLICATIONS

Jaramillo, J.J., et al., "Padded frames: a novel algorithm for stable scheduling in load-balanced switches," IEEE/ACM Transactions on Networking, v 16, n 5, p. 1212-25, Oct. 2008.
Keslassy, I., "The Load-Balanced Router, a Dissertation Submitted to the Department of Electrical Engineering and the Committee on Graduate Studies of Stanford University in Partial Fulfillment of the Requirements for the Degree of Doctor of Philosophy," Stanford University, Stanford, California, Jun. 2004, 133 pages.

* cited by examiner

Primary Examiner — Hanh N Nguyen

(57) ABSTRACT

A forwarding system includes a first processor coupled to connecting devices using a plurality of uplinks, and a second processor coupled to the connecting devices using a plurality of downlinks. The first processor includes, in a memory, one or more queues each corresponding to the second processor, a priority, and/or to a packet cast type (e.g., unicast or multicast). The first processor is configured to select a particular queue, select a particular uplink based on a comparison of measurements corresponding to respective loads of the plurality of uplinks, and cause a fragment or the entirety of a packet in the particular queue to be forwarded to the second processing device using the selected uplink and corresponding connecting device. The second processor is configured to reassemble the packet, reorder the packet into a flow, and forward the packet from the forwarding system.

9 Claims, 13 Drawing Sheets

DYNAMIC LOAD BALANCING SWITCH ARCHITECTURE

CROSS-REFERENCE TO RELATED APPLICATION

This application claims the benefit of U.S. Provisional Patent Application No. 61/322,247, entitled "Dynamic Load-Balancing Switch Architecture," which was filed on Apr. 8, 2010, the entire disclosure of which is hereby incorporated by reference herein.

FIELD OF THE DISCLOSURE

The present disclosure relates generally to communication networks and, more particularly, to switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a large number of ports. For example, a typical data center includes a large number of servers, and switches or forwarding systems to communicatively couple the servers to outside network connections, such as backbone network links. As another example, a high-volume website server system can include a large number of web servers, and switches to communicatively couple the web servers to backbone network links.

In these and similar switching applications, network traffic within a switching or forwarding system should be load balanced among various components of the switch while maintaining the ability to accommodate traffic which has different attributes.

SUMMARY

In one embodiment, a method of load balancing network traffic in a modular forwarding system includes determining, at a source device of the modular forwarding system, a particular uplink from a plurality of uplinks based on a comparison of respective measurements corresponding to respective uplinks in connection with the source device. The respective measurements are indicative of respective traffic loads sent to respective connecting devices of the modular forwarding system using the respective uplinks. The method also includes causing at least a portion or fragment of a data packet or the entire data packet to be forwarded from the source device to a target device of the modular forwarding system using the particular uplink and a corresponding connecting device.

In an embodiment, a load balancing modular forwarding apparatus includes a first processing device coupled to a plurality of uplinks, a second processing device coupled to a plurality of downlinks, and a plurality of connecting devices, each coupled to a respective uplink and a respective downlink. The load balancing modular forwarding apparatus further includes a queue allocated in a memory of the first processing device and corresponding to the second processing device. The first processing device is configured to select a particular uplink based on a comparison of respective measurements corresponding to respective loads of each of the plurality of uplinks, and cause a fragment or the entirety of a data packet in the queue to be forwarded from the first processing device using the particular uplink and a corresponding connecting device.

In another embodiment, a method of processing traffic in a modular forwarding system having a plurality of source devices and a plurality of target devices interconnected by a plurality of connecting devices includes receiving, at a particular target device, a plurality of transmission units corresponding to different data packets, each transmission unit including an indication of a respective source device from which the each transmission unit was forwarded and an identifier or identification corresponding to the respective data packet (packet ID). The method further includes storing, at the particular target device, data corresponding to each transmission unit in a respective portion of a memory that is accessible to the particular target device and that corresponds to the respective source device. The method also includes reordering, in each respective portion of the memory, corresponding data packets based on the stored data corresponding to the plurality of transmission units and corresponding packet IDs, and causing the reordered data packets to be forwarded from the particular target device to respective destinations external to the modular forwarding system.

In an embodiment, a method of load balancing multicast packets in a modular forwarding system having a source device, a plurality of target devices, and a plurality of connecting devices includes determining, at the source device, two or more target devices to which a multicast data packet is to be forwarded. The method also includes determining, at the source device, a particular uplink from a plurality of uplinks, each uplink connecting the source device to a different one of the plurality of connecting devices, where the determining based on a comparison of respective measurements corresponding to respective loads of respective uplinks of the plurality of uplinks. The method further includes causing, at the source device, at least a portion or the entirety of the multicast data packet and at least one indication of at least one of the two or more target devices to be forwarded from the source device to a corresponding connecting device using the particular uplink.

An embodiment includes a load balancing modular forwarding apparatus. The load balancing modular forwarding apparatus includes a source processing device coupled to a plurality of uplinks, a plurality of target processing devices coupled to a plurality of downlinks, and a plurality of connecting devices interconnecting the plurality of uplinks and the plurality of downlinks. The load balancing modular forwarding apparatus further includes a queue allocated in a memory accessible by the source processing device and including an indication of a multicast data packet to be forwarded to two or more target devices. In this embodiment, the source processing device is configured to select a particular uplink from the plurality of uplinks based on a comparison of respective measurements corresponding to respective loads of respective uplinks of the plurality of uplinks, and cause at least a portion or the entirety of the multicast data packet, an indication of the multicast data packet (packet ID), and at least one indication of at least one of the two or more target devices to be forwarded, using the particular uplink, to a connecting device corresponding to the particular uplink.

DETAILED DESCRIPTION

Example switching methods and apparatus are described herein in the context of Ethernet networks. It is noted that similar methods and apparatus are suitable for use in other communication networks as well.

Figure 1:
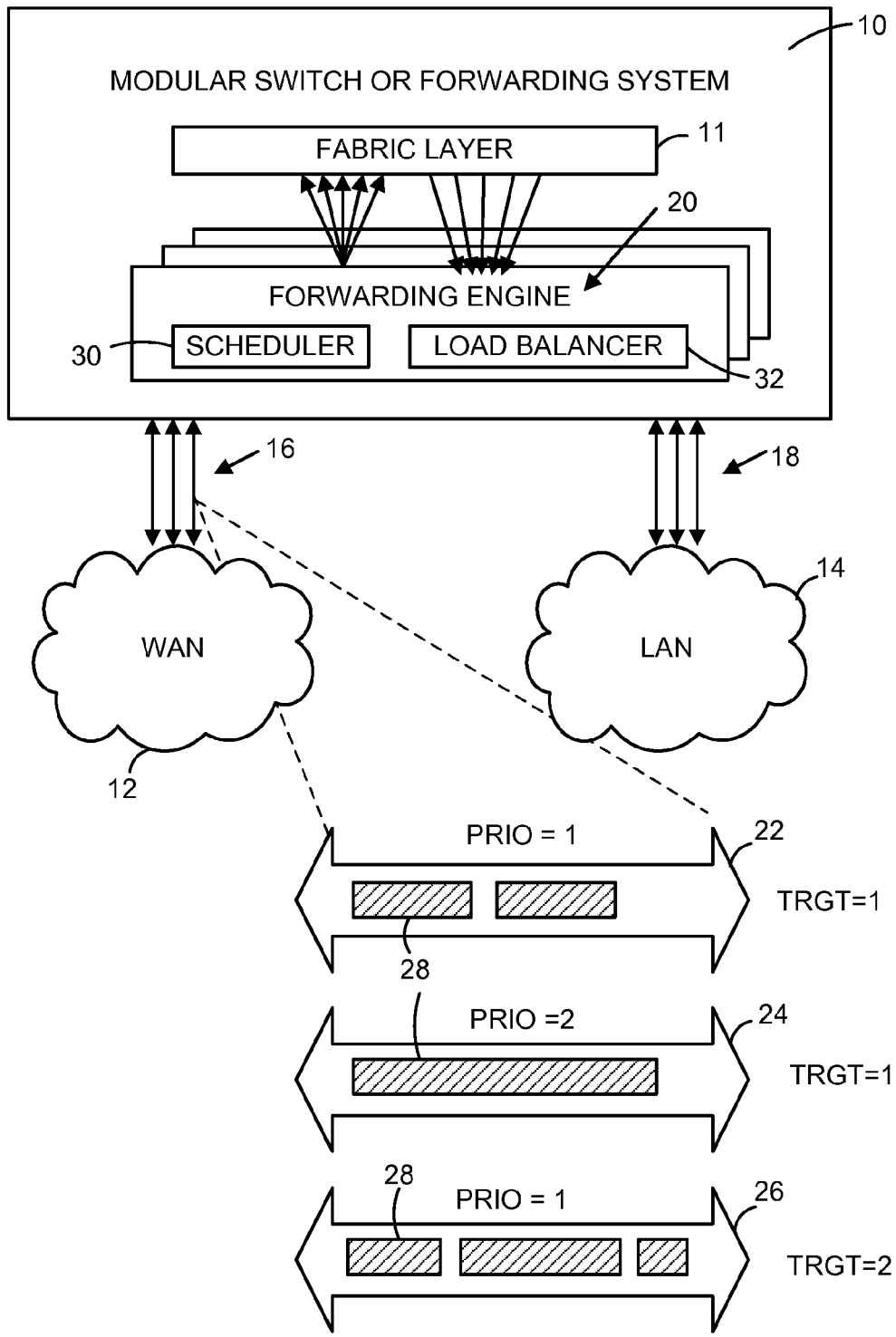
FIG. 1 is a block diagram of an example communication system in which a modular network switch is utilized in accordance with an embodiment of the present disclosure.

FIG. 1 is a block diagram of a modular switch or modular forwarding system 10, capable of efficiently and reliably forwarding traffic through a fabric layer 11, in an example arrangement between an external network such as Wide Area Network (WAN) 12 and an internal network such as Local Area Network (LAN) 14. The terms "modular switch," "modular forwarding system," modular network switch," "forwarding system," "network switch," and "switch" are used interchangeably herein, unless otherwise indicated. The modular switch or forwarding system 10 includes a chassis to support several modules such as, for example, "blade" cards compatible with Peripheral Component Interconnect (PCI), PCI Express, or a similar standard. At least some of the cards include one or several components that support networking functions, referred to herein as "packet processors." As discussed in more detail below, a packet processor of the modular switch or forwarding system 10 generally includes a network interface with one or several network ports to communicate with the network 12 or 14 via respective groups of links 16 and 18, and an internal interface with one or several uplink ports to communicate with other cards mounted on the chassis via so-called uplinks, or communication links internal to the modular switch or forwarding system 10.

In some embodiments, the speed of network ports is substantially higher than the speed of individual uplinks. To ensure that the modular switch or forwarding system 10 introduces little latency to the network traffic flowing through the modular switch or forwarding system 10, and to provide quality-of-service (QoS) compliance, forwarding engines 20 implement methods for operating virtual output queues (VoQs) that are specific to destinations as well as traffic priorities, forwarding multicast and unicast packets in a load-balanced manner across the fabric layer 11, and efficiently synchronizing connecting devices used to interconnect packet processors, etc. The VoQs are included in packet processors of the modular switch or forwarding system, and are identified, for example, by a target destination and/or a priority. The packet processors then generate transmission units that each include one or more data packets that correspond to or are retrieved from a particular VoQ. These and other techniques for load-balancing and synchronization are discussed in detail below with reference to FIGS. 2-12.

Referring still to FIG. 1, in an embodiment the modular switch or forwarding system 10 is used in connection with a data server system, as part of a router, or to perform a networking function in connection with another type of host system. The external network 12 in this example is a wide area network (WAN) such as the Internet, and the internal network 14 is a local area network (LAN) such as one serving a particular a corporation, a university, or any other organization. However, in some applications, the networks 12 and 14 are each a public network, a private network, or some combination of private and public networks. Additionally or alternatively, the modular switch or forwarding system 10 functions as a router between two or more several wide area networks or local area networks.

The modular switch or forwarding system 10 communicates with the network 12 in a wired manner or wireless manner via a group of high-speed links 16 that includes, for example, T-carrier links such as T1s, fiber optic cables, or any other suitable communication links including those currently known to those of ordinary skill in the art. The network 14 similarly communicates with the modular switch or forwarding system 10 via a similar wired or wireless connection 18. Further, some or all of the links in the groups 16 and 18 correspond to a plurality of physical carriers such as wires, cables, or carrier radio frequencies.

With continued reference to FIG. 1, the links 16 and 18 carry several data flows 22-26, each characterized by some or all of a source, target, and a type of traffic, in an embodiment. The type of traffic corresponds to a certain traffic class (TC), a class of service, or one of a set of priority levels defined for the network 12 or 14, in an embodiment. Each of flows 22-26 includes multiple data units (also interchangeably referred to herein as "data packets" or "packets") 28 (e.g., Ethernet packets) of equal or differing lengths, although some flows are generally associated with long packets, while other flows are typically associated with short packets. For example, a flow corresponding to a file download is typically associated with longer packets and a flow corresponding to message chat traffic is typically associated with shorter packets. In general, each of the data packets 28 travels either in the inbound or outbound direction relative to the modular switch or forwarding system 10.

Depending on the implementation or configuration, the modular switch or forwarding system 10 receives a data packet at a source device via a source port, also referred to herein as an ingress port. For the purposes of grouping data packets into flows, the modular switch or forwarding system 10 associates the target of the data packet with a certain device or a certain port on a device via which the data packet exits or egresses the forwarding system 10 via an egress port, also referred to herein as a target port.

Further, certain time-critical network traffic (e.g., video streaming) is assigned a relatively high priority, while other delay-tolerant traffic is assigned a lower priority. In some embodiments, the number and the types of priorities the modular switch or forwarding system 10 can support is user-configurable. In the example illustrated in FIG. 1, the flow 22 includes priority 1 data packets traveling toward a target or destination device 1; the flow 24 includes priority 2 data packets traveling toward the same target; and the flow 26 includes priority 1 data packets traveling toward a target or destination device 2.

In accordance with embodiments of the present disclosure, the modular switch or forwarding system 10 includes a scheduler 30 and a load balancer 32. The scheduler 30 coordinates the delivery or forwarding of data packets of varying lengths and priorities through the modular switch or forwarding system 10 to various targets, and the load balancer 32 balances the packet traffic loads at and between components of the modular switch or forwarding system 10. Embodiments of the scheduler 30 and the load balancer 32 are discussed in more detail in subsequent sections.

Figure 2:
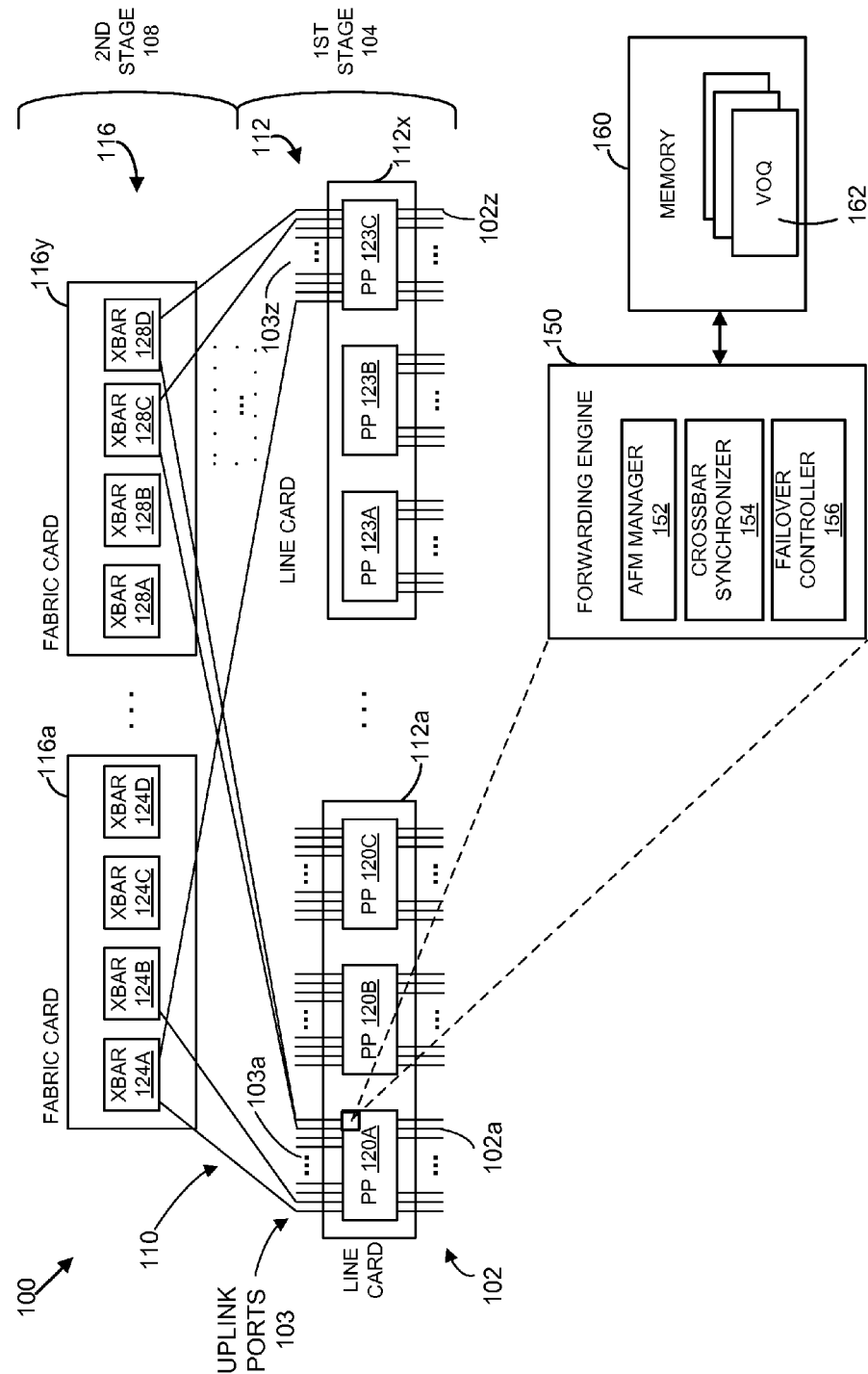
FIG. 2 is a block diagram of an example modular network switch that includes several line cards and several fabric cards in accordance with an embodiment of the present disclosure.

FIG. 2 is a diagram of an example modular switch or forwarding system 100 that is suitable for use as the switch or forwarding system 10 of FIG. 1, for example, in data centers, server farms, or any systems that require switching or routing between a large number of ports. The modular switch or forwarding system 100 comprises a plurality of switching stages including a first stage 104 and a second stage 108. The first stage includes a first plurality of ports 102, referred to herein as front ports or network ports. The network ports 102 are utilized for coupling to LANs, WANs, servers, other switching systems, etc. The first stage also includes a second plurality of ports, referred to herein as uplink ports 103. The uplink ports 103 are utilized for coupling the first stage 104 to the second stage 108 via communication links 110 referred to herein as uplinks. In an embodiment, the modular switch or forwarding system 100 includes forty-eight uplink ports 103; however, any suitable number of uplink ports 103 may be included in the modular switch or forwarding system 100. In an example, the modular switch or forwarding system 100 includes M uplink ports coupled to M uplinks, where M is an integer equal to or greater to one and corresponds to a total number of crossbar devices included in the second stage 108. The second stage 108 also includes a plurality of ports that are coupled to the uplinks 110.

In the example embodiment depicted in FIG. 2, some of the network ports 102 transmit or receive network traffic at different speeds. For example, some of the network ports 102 transmit or receive network at 1 gigabit per second (Gb), other ports operate at 10 Gb, yet other ports operate 100 Gb, in an embodiment. In general, there is a potentially wide range and a potentially large number of different speeds at which the network ports 102 may operate. However, in an embodiment, the uplinks 110 operate at the same constant speed that typically is much lower than the speed of the fastest one of the network ports 102. For example, the uplinks operate at 10 Gb while the fastest network port operates at 100 Gb, in an embodiment.

Each stage in the plurality of stages comprises a plurality of devices arranged in groups. In one embodiment, the first stage 104 comprises X groups of packet processors (PPs), and the second stage 108 comprises Y groups of crossbar devices that provide interconnectivity between PPs in the first stage 104. In some embodiments, PPs are used as crossbar devices in the second stage 108. In other embodiments, crossbar devices in the second stage 108 are different than the PPs in the first stage 104. In one embodiment, each group of PPs is arranged on a corresponding card mounted in a chassis. In this embodiment, the first stage 104 comprises X cards 112 (referred to herein as "line cards"), and the second stage 108 comprises Y cards 116 (referred to herein as "fabric cards"). In the embodiment illustrated in FIG. 2, the modular switch or forwarding system 100 comprises a chassis switching system with the total of N PPs and M crossbar devices mounted in a chassis.

For ease of explanation, the groups of PPs in the first stage 104 are referred to as line cards and the groups of crossbar devices in the second stage 108 are referred to as fabric cards in the description below. In accordance with an embodiment, groups of devices are arranged on separate cards as seen in FIG. 2. It is noted that each group of devices need not be arranged on a separate card. Rather, in accordance with an embodiment, multiple groups of devices are arranged on a single card. Additionally, the modular switch or forwarding system 100 need not be a chassis switching system and the groups of the PPs or crossbar devices need not be arranged on cards in a chassis.

Generally speaking, in accordance with an embodiment, a packet processor such as the packet processor 102a illustrated in FIG. 2 receives data packets at one or more network ports 102 and, upon processing the data packets in an ingress pipeline and an egress pipeline, transmit at least the payload of the data packets to another packet processor operating in the same chassis (although not necessarily within the same line card 112a). For example, when a data unit or data packet is received via one of the network ports 102a, the data unit is forwarded to one or more of the fabric cards 116. The one or more fabric cards 116 then forwards the data unit to one of the line cards 112, and the data unit is finally transmitted or egressed from the forwarding system 100 (e.g., to a network 14 or 16) via one of the front ports 102z. Note that at any instance in time, a particular network port or front port 102 may operate as an ingress port and/or as an egress port for different traffic flows, in an embodiment.

To properly forward data packets through the system 100, a source PP in the first stage 104 generates forwarding tags for each packet. In an embodiment, a forwarding tag is included in a header of the packet; in another embodiment, the forwarding tag is included in a packet descriptor or uniform header corresponding to the packet and used within the switch; and in yet another embodiment, the forwarding tag is distinct from the header, packet descriptor or uniform header of the packet. The tag includes information that is used for making load balancing decisions within the system 100, in an embodiment. For example, the forwarding tag includes a system egress or target destination, a priority, ordering information with respect to a flow, etc. The crossbar devices use the forwarding tag to direct the packet to the target PP within the system 100. Further, because it is more efficient to forward larger chunks of data through stages 104 and 108, in accordance with an embodiment, PPs such as the PP 120a are configured to aggregate data packets received via the network ports 102 in VoQs (Virtual Output Queues) created and managed for each flow identified by a target destination and a priority. The PPs then generate transmission units that include one or several data packets stored in the corresponding VoQ. As used herein, "transmission units" are communication units forwarded between modules of a forwarding system 10 that include data that shares a certain target and a certain type of traffic or priority (e.g., a class of service, a traffic class). It is noted that in some embodiments, non-aggregated data packets are forwarded through stages 104 and 108, that is, a single transmission unit includes data corresponding to only one data packet to be forwarded through the stages 104 and 108.

In the example system 100, each line card 112 comprises three PPs. For example, in the example of FIG. 2, the line card 112a includes a PP 120a, a PP 120b, and a PP 120c, and the line card 112b includes a PP 123a, a PP 123b, and a PP 123c. In other embodiments, the line cards 112 have greater than or less than three PPs, and each line card 112 need not have the same number of PPs. In the example system 100, each fabric card comprises four crossbar devices ("XBARs"). For example, the fabric card 116a includes an XBAR 124a, an XBAR 124b, an XBAR 124c, and an XBAR 124d. Also, the fabric card 116y includes an XBAR 128a, an XBAR 128b, an XBAR 128c, and an XBAR 128d.

As discussed above, the system 100 comprises a plurality of packet processors (PPs) and XBARs arranged in stages and groups as discussed above. Each PP or XBAR is a switching device and itself has a plurality of ports. Generally speaking, each PP/XBAR is capable of receiving a data unit, such as a data packet, and making a decision regarding the port of the PP/XBAR via which the data packet should be transmitted. Then, the PP/XBAR transmits the data packet via the determined port of the PP/XBAR.

In an embodiment, each PP in the first stage 104 is coupled to a plurality of fabric cards 116 via at least some of the uplinks 110. For example, each PP in the first stage 104 is coupled to at least one XBAR in each of the fabric cards 116. As another example, each PP in the first stage 104 is coupled to every XBAR in the second stage 108. As yet another example, each PP in the first stage 104 is coupled to a different subset of XBARs in the second stage 108. In FIG. 2, only some of the uplinks 110 between the line cards 112a and 112x and the fabric cards 116a and 116y are illustrated, whereas other uplinks, such as uplinks between other PPs and the fabric cards 116, are not illustrated to avoid obscuring the figure.

In one embodiment, the system 100 includes sixteen line cards 112 (X=16) and eight fabric cards 116 (Y=8), where each line card 112 includes three PPs and each fabric card 116 includes four XBARs. In this embodiment, there are thus 48 PPs (N=48) in the first stage 104 and 32 XBARs (M=32) in the second stage 108. In an embodiment, each PP in the first stage 104 provides 48 ports: 16 front ports and 32 uplink ports. Thus, if there are 48 PPs in the first stage 104, the first stage 104 would provide 768 front ports and 1536 uplink ports.

Each PP in the first stage 104 need not have the same amount of ports as each XBAR in the second stage 108. In an embodiment, each PP in the first stage 104 includes 48 ports, whereas each XBAR in the second stage 108 includes 32 ports. In this embodiment, if there are 32 PPs in the first stage 104 and each XBAR in the first stage 104 provides 24 front ports and 24 uplink ports, the first stage 104 would provide 768 front ports and 768 uplink ports. If there are 24 XBARs in the second stage 108 and each XBAR in the second stage 108 provides 32 ports, the second stage 108 would be capable of connecting to 768 uplinks.

With continued reference to FIG. 2, each PP in the first stage 104 includes a forwarding engine 150 to process data packets arriving and leaving via the network ports 102, as well as data packets arriving and leaving via uplink ports from other PPs via the crossbar devices in the second stage 108. As illustrated in FIG. 2, the forwarding engine 150 includes an aggregated frame multiplexing (AFM) manager 152, a crossbar synchronizer 154, and a failover controller 156. In an embodiment, the forwarding engine 150 is implemented at least partially in hardware. In some embodiments, the forwarding engine 150 is implemented at least partially by a processor executing software or firmware instructions. In operation, the forwarding engine 150 interacts with a memory 160 in which several VoQs 162 are configured for various combinations of target devices and priority parameters.

The AFM manager 152 stores data packets for forwarding in VoQs, each of which are dedicated to a particular priority, and in some cases, to a particular target device. The AFM manager 152 independently manages each of the VoQs 162. One or more packets are added to a same VoQ, and in some embodiments, more than one VoQ corresponds to a priority or a certain target device/priority combination. It is to be further noted that a packet processor supports any desired and suitable number of priorities and targets, and accordingly maintains any desired and suitable number of VoQs. In some embodiments, each target device (e.g., targets $T_1$ and $T_2$) to which a VoQ corresponds is a packet processor, while in other embodiments each target device to which a VoQ corresponds is a network port on a particular packet processor. Also, a packet processor in at least some embodiments maintains a certain number of multicast VoQs to store data packets traveling to multiple targets, which can also be particular packet processors or particular ports of particular packet processors. If desired, each multicast VoQ is associated with a particular priority, and in some cases, with a particular target.

It is noted that in an embodiment, each packet corresponds to both a particular target and a particular priority. Thus, a VoQ used for unicast transmissions stores data packets having not only a common destination but also a common latency requirement or other quality characteristic of the priority.

Figure 3:
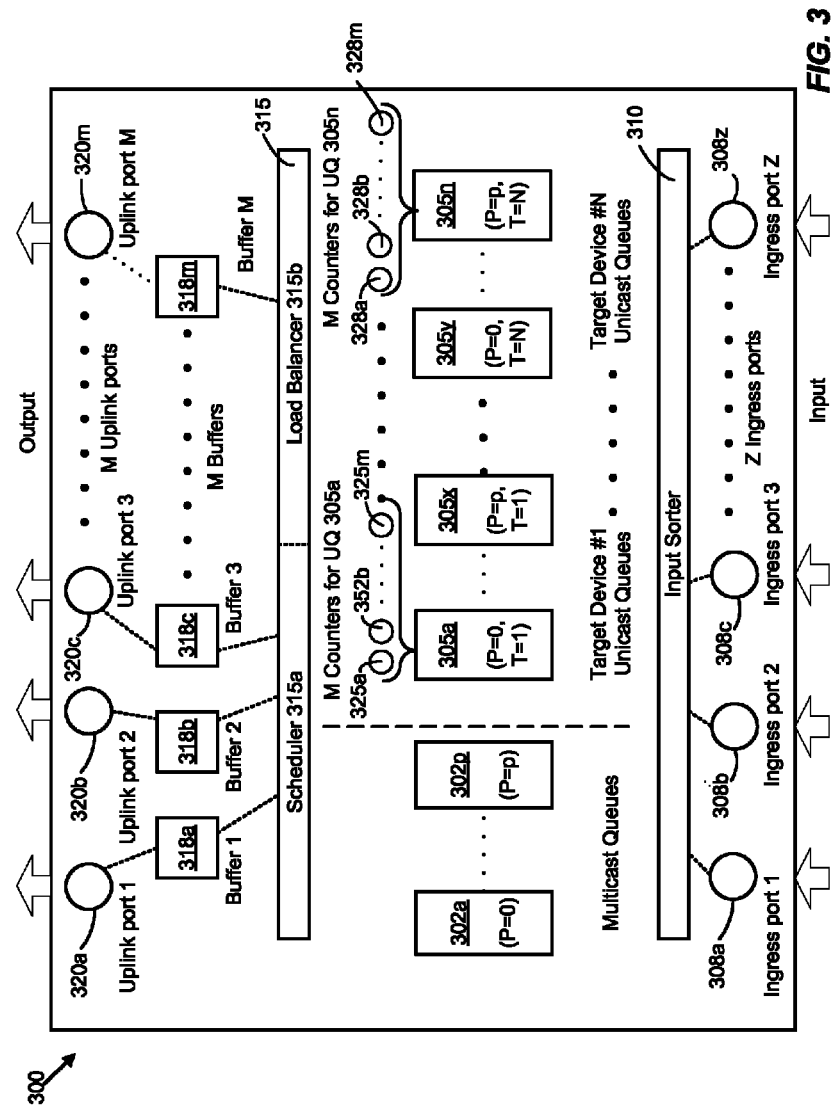
FIG. 3 is a block diagram of an example packet processor that services ingress data to the modular network switch of FIG. 2 in accordance with an embodiment of the present disclosure.

FIG. 3 is a block diagram of an example packet processor 300 that services ingress data to the modular switch or forwarding system 10 of FIG. 1 and/or the modular switch or forwarding system 100 of FIG. 2 in accordance with an embodiment of the present disclosure. For example, the packet processor 300 is one of the packet processors 120A-120C or 123A-123C illustrated in FIG. 2. Of course, in other embodiments, the packet processor 300 operates in conjunction with other suitable modular switches or forwarding systems. The packet processor 300 is also referred to as "the load-balancing ingress packet processor 300" or "the ingress packet processor 300". FIG. 3 illustrates processing elements corresponding to processing a packet that ingresses the modular switch. Processing elements corresponding to processing a packet that egresses the modular switch or forwarding system are omitted from FIG. 3 for clarity.

In the embodiment illustrated by FIG. 3, the load-balancing ingress packet processor 300 is one of N packet processors of the forwarding system 10, and receives unicast and/or multicast packets from the network 12 or the network 14, services the packets, and forwards them to the fabric layer 11 or second stage 108. The ingress packet processor 300 administers multicast virtual output queues (VoQs) 302a-302p, where each multicast VoQ 302a-302p corresponds to a particular priority (e.g., 0 through p) of packets that are to be multicast. The packet processor 300 also administers unicast virtual output queues (VoQs) 305a-305x through 305y-305n, where each unicast VoQ 305a-305n corresponds to both a particular priority (e.g., 0 through p) and to a particular target device T, where T is an integer from 1 to N, of packets that are to be unicast. In some embodiments, multiple queues (either multicast queues for packets that are to be multicast, unicast queues for packets that are to be unicast, or both multicast queues and unicast queues) correspond to a same target and a same priority. For example, the packet processor 300 includes more than one multicast queue corresponding to a priority (p-3), or includes more than one unicast queue corresponding to target device 4 and priority 2, according to some embodiments.

Packets arrive at the packet processor 300 via ingress ports 308a-308z. An input sorter 310 associates each incoming packet with one of the VoQs 302a-302p, 305a-305x through 305y-305n according to the incoming packet's target device, priority and cast type (e.g., multicast or unicast). For example, an incoming unicast packet arriving at ingress port 308z with a priority of p and destined for a target device 1 is placed into VoQ 305x, and an incoming multicast packet arriving at ingress port 308b with a priority of 0 and destined for target device 1 is placed into VoQ 302a.

The ingress packet processor 300 includes embodiments of the scheduler 30 and the load balancer 32 of FIG. 1, shown respectively by reference numerals 315a and 315b, respectively, in FIG. 3. Although the scheduler 315a and the load balancer 315b are depicted in FIG. 3 as elements of a single component, in some embodiments, the scheduler and the load balancer are separate, distinct components within the packet processor 300.

The scheduler 315a obtains data packets from the VoQs 302a-302p and 305a-305n, and places each particular retrieved packet into a particular buffer 318a-318m. Alternatively, the scheduler 315a associates each retrieved packet with a particular buffer 318a-318m, in an embodiment. Each buffer 318a-318m corresponds to a respective uplink port 320a-320m communicatively coupled to a respective uplink, such as previously discussed with respect to FIG. 2. As previously discussed, the packet processor 300 is in connection with M uplinks, where M is an integer equal or greater than one and corresponds to a total number of crossbar devices in the forwarding system 10, in an embodiment. In some embodiments, the number of source/target devices N equals the number of crossbar devices M, whereas in other devices N and M are different.

Figure 4:
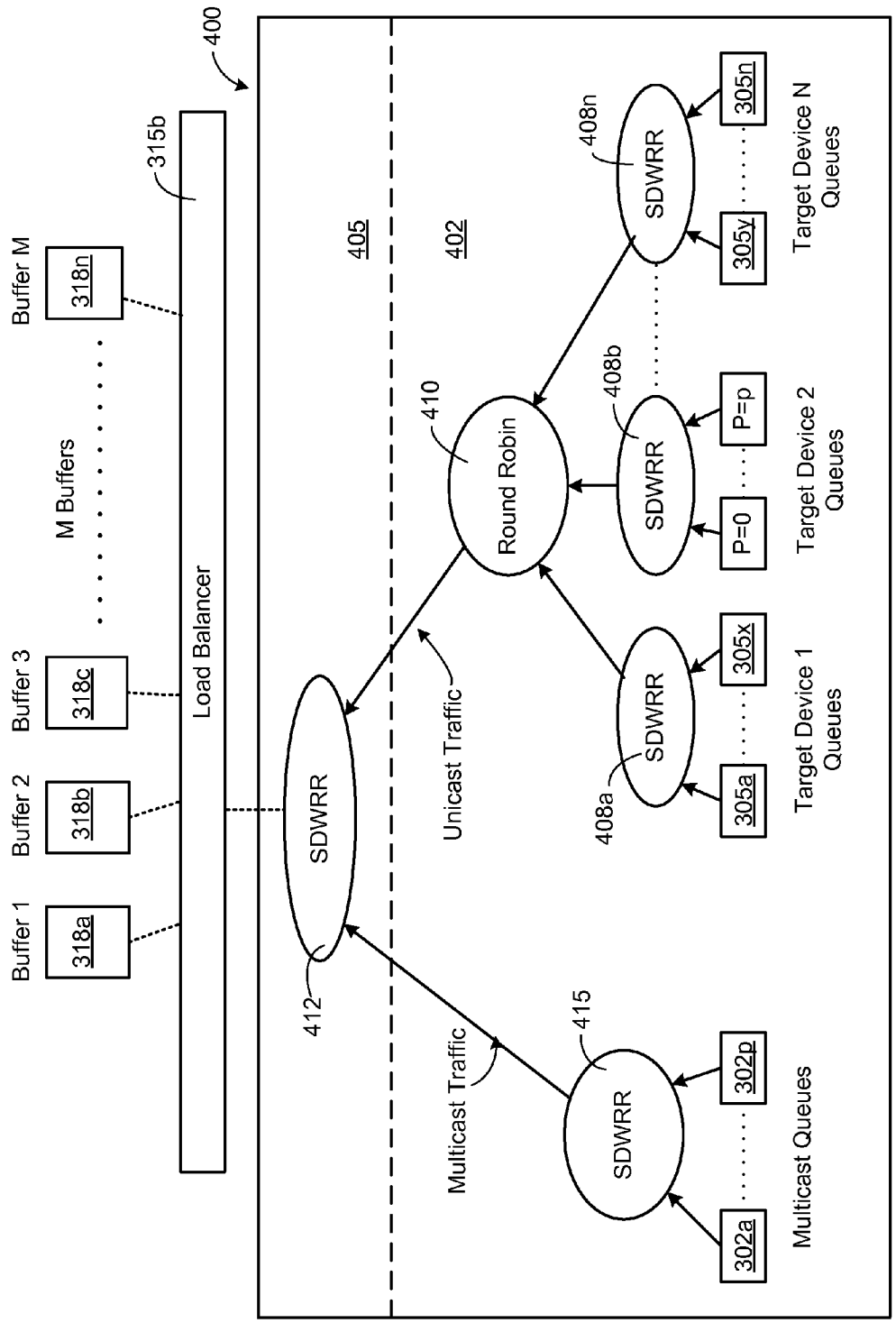
FIG. 4 is a block diagram of an example scheduler of FIG. 3 in accordance with an embodiment of the present disclosure.

As previously described, the scheduler 315a selects packets from the multicast VoQs 302a-302p and the unicast VoQs 305a-305n. FIG. 4 is diagram of an embodiment 400 of the scheduler 315a of FIG. 3 that illustrates an example selection method, and merely for sake of clarity, FIG. 4 is discussed with reference to FIG. 3. In other embodiments, the scheduler 400 is utilized in a packet processor different than the packet processor 300, or the packet processor 300 utilizes a scheduler different than the scheduler 400.

As seen in FIG. 4, the scheduler 400 includes two stages, a first stage 402 and a second stage 405. The first stage 402 includes, in an embodiment, several unicast Shaped Deficit Weighed Round Robin (SDWRR) selectors 408a-408n, each corresponding to a different one of the N target devices. Each of the unicast SDWRR selectors 408a-408n includes several inputs to receive signals, the signals corresponding to packets, from unicast queues that service unicast packets of different priorities for a same target device, e.g., unicast queues 305a-305x for target device 1, unicast queues 305y-305n for target device N, etc. Each of the unicast SDWRR selectors 408a-408n also includes an output coupled to a respective input of a unicast round robin selector 410. The unicast round robin selector 410 selects between the outputs of the unicast selectors 408a-408n and provides corresponding signals to a second stage SDWRR selector 412 of the second stage 405.

The first stage 402 also includes a multicast SDWRR selector 415 that includes several inputs to receive signals, corresponding to packets, from multicast queues of differing priorities, e.g., multicast queues 302a-302p. The multicast selector 415 also includes an output coupled to an input of the second stage SDWRR selector 412. The second stage SDWRR selector 412 receives signals from the multicast selector 415 and the unicast round robin selector 410, and outputs corresponding signals to the load balancer 315b.

In some embodiments of the scheduler 400, instead of utilizing a SDWRR algorithm, one or more of the selectors 408a-408n, 412 or 415 uses a strict priority (SP) algorithm where packets of a higher priority are always selected before packets of a lower priority. In some embodiments, the selector 410 uses an SDWRR or an SP algorithm instead of a round robin algorithm. In other embodiments of the scheduler 400, the scheduler 400 includes only one stage, the scheduler 400 omits the selector 410, and/or one or more selectors 408a-408n, 410, 412 or 415 selects based on a suitable algorithm other than SDWRR, SP or round robin.

Referring now to FIGS. 3 and 4, the load balancer 315b receives the outputs from the second stage selector 412 and selects a particular buffer to which the packet is to be sent (or, is to be associated with) so as to balance packet traffic loads amongst the buffers 318a-318m and thus balance packet traffic loads across the crossbar devices. With regard to unicast traffic, balancing unicast packet traffic across crossbar buffers 318a-318m by the load balancer 315b includes comparing respective measurements corresponding to traffic loads of the respective buffers, in an embodiment. In particular, each unicast queue 305a-305n is associated with M measurement mechanisms or indicators corresponding to the M buffers 318a-318m and/or to their associated uplinks, in an embodiment. For example, in FIG. 3, each unicast queue 305a-305n is associated with M corresponding counters (e.g., M counters 325a-325m corresponding to unicast queue 305a, and M counters 328a-328m corresponding to unicast queue 305n) that each provide an indication of a load of each respective uplink corresponding to each respective buffer 318a-318m, or an amount of data that has been sent from each unicast queue to each of the M buffers 318a-318m to be transmitted over a respective uplink 320a-320m. For example, the counter 325b provides an indication of an amount of data sent from the unicast queue 305a to the buffer 318b and over the uplink 320b. The load balancer 315b compares the M counter values for a particular queue and selects the buffer corresponding to the counter having the lowest measurement of amount of forwarded data, or corresponding to a counter having a measurement below some pre-determined threshold level. (As used herein, the language "sending a packet," "transmitting a packet," or "forwarding a packet" is understood to mean sending at least a portion of the packet, such as actual packet payload, in a transmission unit between devices in the modular switch or forwarding system 10.)

In one embodiment, each of the counters or indicators 325a-325m, 328a-328m measures or counts a respective number of bytes of packet data that are sent to each different crossbar via each of the uplink ports 320a-320m. In other embodiments, other suitable measurements corresponding to the uplinks and ports 320a-320m coupled to the buffers 318a-318m are stored in the indicators 325a-325m, 328a-328m. For example, the measurements used in selecting an uplink include one or more of throughput measurements, rate of service, error rate, etc., in some embodiments. In these embodiments, different suitable selection criteria are utilized. For example, if the measurement compared across uplinks is error rate, the load balancer 315b selects an uplink with a lowest error rate or an error rate below a certain error rate threshold, in one embodiment, whereas if the compared measurement across uplinks is throughput, the load balancer 315b selects an uplink with a highest throughput or a throughput above a certain throughput threshold, in an embodiment. By comparing measurements across uplinks to determine an uplink selection, unicast traffic is more effectively load-balanced across the crossbar devices, at least in some embodiments. In some embodiments, the loads across the crossbar devices are balanced according to respective weights or priorities of the packets.

After a unicast queue from which to draw packets is selected by the scheduler 315a, and a buffer is selected by the load balancer 315b, the load balancer 315b places at least a portion or a fragment of a next unicast packet from the selected unicast queue into the selected buffer. Alternatively, the load balancer 315b associates at least a portion or a fragment of the next unicast packet from the selected unicast queue with the selected buffer. In some embodiments, the entirety of a next unicast packet from the selected unicast queue is associated with the selected buffer instead of a portion or a fragment of the packet.

In an exemplary embodiment, the scheduler 315a and the load balancer 315b perform the following steps for unicast packets:

While (1)
{
  choose a unicast target device in a round robin manner from all the target devices N that have at least one non-empty VoQ;
  select a VoQ from the group of VoQs that are associated with the selected target device;
  find the minimum counter for the selected VoQ;
  if the uplink buffer corresponding to the minimum counter is not full, then send a fragment or the entirety of a packet or data associated with the packet to the corresponding uplink;
  increase the minimum counter corresponding to the size of the sent data;
}
In this manner, unicast packet traffic is generally load-balanced across uplinks, and, accordingly, is generally load balanced across crossbars based on packet size.

In some embodiments, at the initialization of the switch or forwarding system 100, each ingress packet processor 300 sends an initial packet to a designated crossbar rather than relying on a comparison of measurements corresponding to uplinks or uplink buffers. At initialization, by designating different crossbars to different packet processors, the time needed to achieve a steady-state load balanced condition in the forwarding system 100 (and in particular, at the cross bar or fabric stage 116) is reduced, in at least some embodiments and scenarios, and also shortens packet latency due to loads on the uplink buffers 318a-318m, in at least some embodiments and scenarios.

Turning now to multicast traffic load balancing as illustrated in FIG. 3, when a multicast queue 302a-302p that services packets to be multicast is selected by the scheduler 315a, the load balancer 315b obtains a next multicast packet from the selected multicast queue, and chooses a buffer based on a randomly or pseudo-randomly (hereinafter referred to as randomly) uniform distribution, in an embodiment. In some embodiments, the load balancer 315b chooses from only the buffers 318a-318m that have sufficient room for a fragment or the entirety of the next multicast packet. The packet processor 300 determines the set of target devices to which the next multicast packet is to be forwarded, and the packet processor 300 (e.g., the load balancer 315b) places at least a portion of the next multicast packet from the selected multicast queue into the selected buffer. In another embodiment, the packet processor 300 associates at least a portion or fragment of the next multicast packet from the selected multicast queue with the selected buffer. In this manner, multicast packet traffic is load-balanced, in the average, across uplink buffers (and, accordingly, crossbar devices), as a number of bytes of packets sent to the crossbar devices are essentially leveled across the crossbar devices over time.

Whether a packet is unicast or multicast, in some cases, a packet is fragmented to decrease the maximum size of transmission units being forwarded through the modular switch or forwarding system 10. A smaller maximum transmission unit size favorably impacts certain system parameters such as delay and sizes of reorder buffers. If a packet is fragmented and forwarded through the system 10 via multiple transmission units, each transmission unit includes an indication of whether the transmission unit is an initial or a final fragment of the packet, as well as an identification of the packet to which it belongs. In some embodiments, the transmission unit also includes an indication of a fragment sequence order for use in packet reconstruction at the target device.

Within the modular switch or forwarding system 10, packets are identified by a packet identifier or identification ("packet ID") that is included in headers or forwarding tags of the packets or transmission units. Using the techniques described herein, a packet ID is generated by an ingress packet processor and is included in headers or forwarding tags of intra-switch transmission units for use by an egress packet processor in re-ordering and/or reassembling a packet. Embodiments of the packet ID of the present disclosure are generally shorter than currently known intra-switch packet identification techniques, and thus result in decreased intra-switch traffic and in decreased amounts of memory at egress packet processors used for re-ordering and re-assembly of packets. Embodiments of the egress processor are provided in a later section.

With regard to packet IDs for unicast packets, in an embodiment, a global device identifier (e.g., a "global ID") is used as a unicast packet ID, where the global ID uniquely identifies a particular ingress packet processor of the modular switch or forwarding system 10, in an embodiment. The global ID is independent of priority, for example. In other embodiments, a unicast packet ID is a local identifier that is locally unique to a particular ingress packet processer (e.g., a "local ID"). In an embodiment, a particular VoQ identifier corresponds to a particular priority and is independent of other VoQs. In other embodiments, other suitable unicast packet identifiers in headers of packets or transmission units are utilized.

Figure 5A:
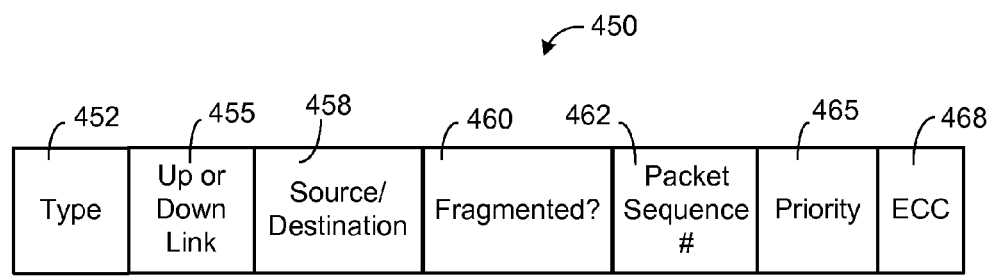
FIG. 5A is a block diagram of an example packet header used to transmit unicast packets between devices in the modular network switch of FIG. 2 in accordance with an embodiment of the present disclosure.

FIG. 5A illustrates an example unicast packet or transmission unit header or forwarding tag 450 used to transmit unicast packets between devices within the modular network switch of FIG. 2 in accordance with an embodiment of the present disclosure. In an embodiment, the unicast header 450 is generated by the ingress packet processor 300, and is included in the transmission unit sent from the packet processor 300, using one of the uplink ports 320a-320m, to the fabric layer 11, e.g., in a uplink transmission. In an embodiment, the same unicast header format 450 is generated by the crossbar or fabric layer 11 and included with a unicast packet or transmission unit sent from the fabric layer 11 to a target packet processor, e.g., in a downlink transmission.

The unicast header 450 includes a type field 452 that indicates whether the packet, transmission unit, or header corresponds to a unicast or multicast packet. The unicast header 450 includes an up or down link indication 455 that corresponds to whether the packet is being transmitted over an uplink to a crossbar or is being transmitted from the crossbar via a downlink to a target packet processor. A field 458 indicates the target device when used in an uplink message, and indicates the source device when used in a downlink message. For example, for an uplink message, the field 458 includes a packet ID corresponding to a global device identifier of a particular target device, and for a downlink message, the field 458 includes a packet ID corresponding to a particular VoQ at a particular ingress packet processor from which the packet was forwarded. In another embodiment, the field 458 includes, for a downlink message, a packet ID corresponding to a particular source device from which the packet was forwarded.

The unicast header 450 includes a field 460 that indicates whether the packet is fragmented. If the packet is fragmented, the field 460 also indicates whether the transmission unit is an initial fragment, a final fragment, or an intermediate fragment. If the transmission unit is an intermediate fragment, the field 460 indicates a sequence number or order of the particular intermediate fragment within the packet, in an embodiment, or in some embodiments, the field 460 does not indicate a fragment sequence. Similarly, a packet sequence number field 462 indicates a sequence number or order of the packet within a data flow, in an embodiment. The header 450 also includes an indication of a priority 465, such as the priority of the packet, data flow, etc., and the header 450 includes an error detection/correction code or other suitable mechanism 468 to check for and/or correct errors in the transmitted header 450. In one embodiment, the header 450 includes 32 bits, and the number of bits in each of the fields 452-468 is as follows:

Type: 1 bit to indicate unicast or multicast;
Up or Down Link: 1 bit to distinguish uplink or downlink transmission;
Source/Destination: 7 bits corresponding to 128 possible packet processors in the modular switch;
Fragmented: 2 bits that indicate not fragmented, fragmented and initial fragment, fragmented and final fragment, fragmented and intermediate fragment;
Packet Sequence: 13 bits to indicate the sequence of the packet in a data flow;
Priority: 3 bits; and
ECC: 5 bits.

Of course, in other embodiments, the number of bits in each field differs from the above example. Furthermore, in some embodiments, the unicast header 450 includes additional fields not shown in FIG. 5A. Also, in some embodiments, one or more of the fields 452-468 are omitted. In some embodiments, the ordering of the fields 452-468 is different than shown in FIG. 5A.

With regard to multicast packet headers and packet identifiers therein, as a particular packet is sent to multiple target devices, more than one packet ID is associated with the packet, in some embodiments and scenarios. Accordingly, in an embodiment, a header of a multicast packet includes a bitmap indicating the multiple target devices to which the multicast packet is to be forwarded. Each set bit in the bitmap corresponds to a particular target device, for example. The crossbar or fabric layer 11 then simply consults the bitmap to determine the set of destination target devices for the multicast packet.

Figure 5B:
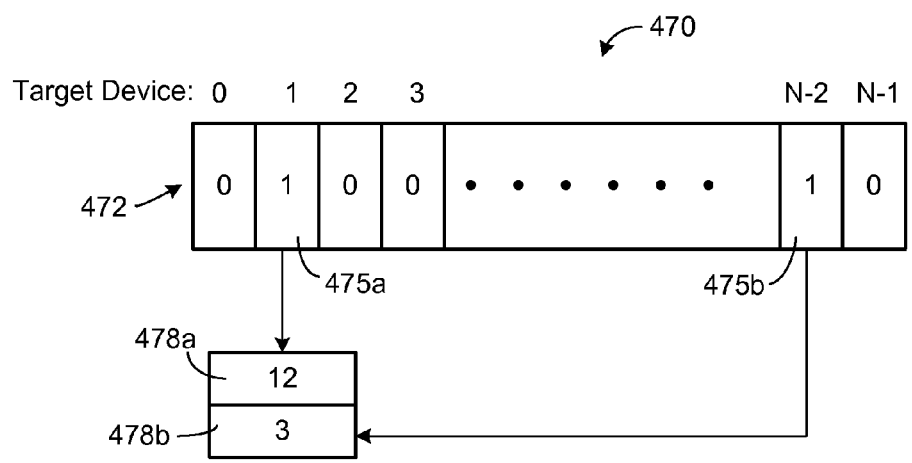
FIG. 5B is a block diagram of an example field of an example packet header used in communications of multicast packets between devices in the network switch of FIG. 2 in accordance with an embodiment of the present disclosure.

FIG. 5B is a block diagram of an example bitmap field 470 used in forwarding multicast packets within the modular network switch of FIG. 2 in accordance with an embodiment of the present disclosure. In an embodiment, the ingress packet processor 300 of FIG. 3 uses the example field 470 in a multicast packet header when communicating with the fabric layer 11. The field 470 includes a bitmap 472 having a bit corresponding to each target device in the forwarding system 10. A set bit indicates that the multicast packet is to be forwarded to the corresponding target device in an embodiment. In another embodiment, a cleared bit indicates that the multicast packet is to be forwarded to the corresponding target device. If the multicast packet is to be forwarded to a particular target device, the field 470 is extended to include a packet ID corresponding to the particular target device. In the example of FIG. 5B, the multicast packet is to be forwarded to target devices 1 and N−2, as indicated by the set bits 475a and 475b, respectively. Each of the set bits 475a, 475b points to a respective packet ID 478a, 478b of a corresponding target device included in the field 470. Thus, in this example, target device 1 has a packet ID of 12 (reference 478a), and target device N−2 has a packet ID of 3 (reference 478b). Upon reception of the field 470, the fabric layer 11 parses the field 470 and includes the packet ID 478a and the packet ID 478b in respective headers or forwarding tags of instances of the multicast data packet that the fabric layer 11 forwards to respective target devices 1 and N−2.

Figure 5C:
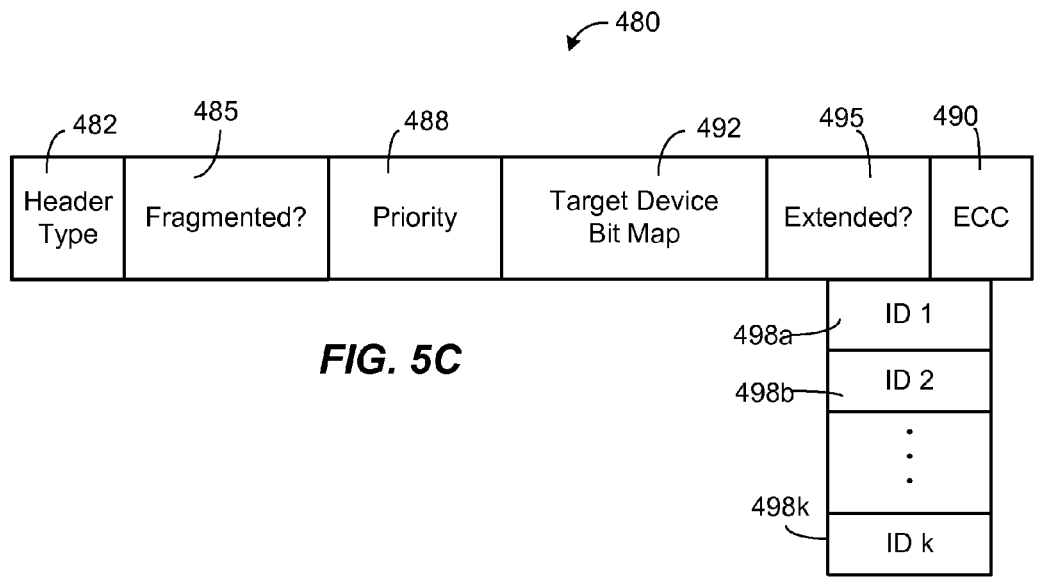
FIG. 5C is a block diagram of an example packet header used to transmit uplink multicast packets between devices in the modular network switch of FIG. 2 in accordance with an embodiment of the present disclosure.

FIG. 5C is a block diagram of an example multicast packet header or forwarding tag 480 used to transmit uplink multicast data packets between devices in the modular network switch of FIG. 2 in accordance with an embodiment of the present disclosure, and incorporating the field 470 of FIG. 5B, in an embodiment. In particular, the packet header or forwarding tag 480 is generated by the ingress packet processor 300, and is included in the multicast packet sent from the packet processor 300 to one of the connecting or crossbar devices of the fabric layer 11 using one of the local uplink ports 320a-320m, e.g., in an uplink transmission of a multicast packet. Similarly to the unicast packet header 450 of FIG. 5A, the multicast uplink packet header 480 includes a header type field 482, an indication of fragmentation 485, a priority 488 and an ECC or other error detection/correction field 490. Additionally, the multicast header 480 includes a bit map field 492 (e.g., the bit map field 470 of FIG. 5B) along with an indication 495 of whether or not the bit map 492 is extended. For example, if packet IDs corresponding to set bits in the bit map field 492 are included in the bit map field 492 (e.g., references 498a-498k), the indication 495 indicates that the bit map 492 is extended to include those packet IDs.

In one implementation of the multicast uplink header 480, the header 480 includes 41 bits corresponding to 24 possible target devices represented in the bit map 492, and the number of bits in each of the fields 482-490 is as follows:

Type: 1 bit to indicate unicast or multicast;
Fragmented: 2 bits that indicate not fragmented, fragmented and initial unit of the packet, fragmented and final unit of the packet, fragmented and intermediate unit of the packet (similar to that used in the unicast header 450);
Priority: 3 bits;
Target Device Bit Map: 24 bits corresponding to 24 possible target devices in the modular switch to which the packet is to be forwarded;

Extended: 1 bit to indicate that an extension (reference 498) is present; and

ECC: 11 bits.

The extension field 498 includes the packet IDs for the indicated target devices in bit map 492 to which the multicast packet is to be forwarded, and its length is determined according to the number of indicated target devices. Of course, in other embodiments, the number of bits in each field 482-490 differs from the above example. In some embodiments, one or more of the fields 482-490 are omitted. In some embodiments, additional fields are added. In some embodiments, the ordering of the fields 482-490 is different than shown in FIG. 5C.

Figure 5D:
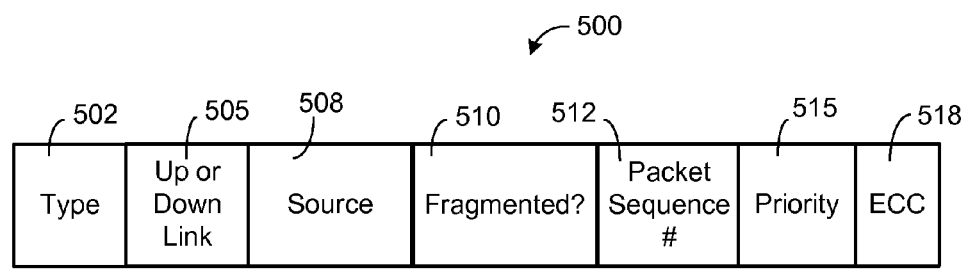
FIG. 5D is a block diagram of an example packet header used to transmit downlink multicast packets between devices in the modular network switch of FIG. 2 in accordance with an embodiment of the present disclosure.

FIG. 5D is a block diagram of an example multicast packet header or forwarding tag 500 used to transmit downlink multicast packets between devices in the modular network switch of FIG. 2 in accordance with an embodiment of the present disclosure. In particular, the packet header 500 is generated by a cross bar device in the fabric layer 11, and is included in the packet sent from the crossbar device to a target device or packet processor, e.g., in a downlink transmission of a multicast packet. Similarly to the unicast packet header 450 of FIG. 5A, the multicast downlink packet header 500 includes a type field 502, an indication of an uplink or downlink transmission 505, an indication of the source device or packet processor 508 from which the packet was forwarded, an indication of fragmentation 510, a packet sequence indication 512, a priority 515 and an ECC or other error detection/correction field 518. In fact, in some embodiments, the header 500 used with downlink multicast packets has an identical format to the header 450 used for uplink and downlink multicast packets, except for the value of the type indicator field 502.

In one implementation of the multicast downlink header 500, the header 500 includes 32 bits, and the number of bits in each of the fields 502-518 is as follows:

Type: 1 bit to indicate multicast (and to distinguish from a unicast packet);

Up or Down Link: 1 bit to indicate a downlink transmission;

Source: 7 bits corresponding to 128 possible packet processors in the modular switch;

Fragmented: 2 bits that indicate not fragmented, fragmented and initial unit, fragmented and final unit, fragmented and intermediate unit;

Packet Sequence: 13 bits to indicate the packet's sequencing in the data flow;

Priority: 3 bits; and

ECC: 5 bits.

Of course, in other embodiments, the number of bits in each field differs from the above example. In some embodiments, one or more of the fields 502-518 is omitted. In some embodiments, additional fields are added. In some embodiments, the ordering of the fields 502-518 is different than shown in FIG. 5D.

Note that in FIGS. 3, 4, and 5A-5D, for uplink messages received at a crossbar device of the fabric layer 11, the crossbar device merely parses headers or forwarding tags of received uplink unicast and multicast packets (e.g., headers 450 and 480) to determine to which target devices a packet is to be forwarded. For example, for a unicast packet received at the crossbar, the crossbar alters the header 450 to indicate a downlink message in the field 455 and the source device from which the packet was received in the field 458, and forwards the packet to the target device originally indicated in the field 458.

In another example, for a multicast packet received at a crossbar device, the crossbar device simply parses the header 480 of the multicast packet to determine the target devices to which the multicast packet is to be forwarded. For example, the crossbar determines the target devices from the bit map 492 in the header 480. The crossbar replicates the packet and attaches a downlink multicast header or forwarding tag 500 to each replicated packet. Then, the crossbar forwards the replicated packets with respective attached headers 500 to each of the target devices indicated in the bit map 492.

Note that for this embodiment, the crossbar merely needs to parse the uplink header 450 to determine the target devices, and does not need to devote any local memory or processing time for table or database lookups in order to determine desired target devices. Additionally, with this embodiment, when mappings of multicast indicators to egress ports change, no database updates are required at the cross bar devices to effectively forward multicast messages, as identification of egress ports and corresponding addresses are provided to the crossbar devices in the uplink multicast headers 480. Furthermore, this embodiment conveniently supports scalability of the modular forwarding system. For instance, when additional packet processors or crossbars are added, the fabric layer 11 does not need to be changed or reconfigured to support multicast routing, as the target device identification and addressing is provided in the headers.

Figure 6:
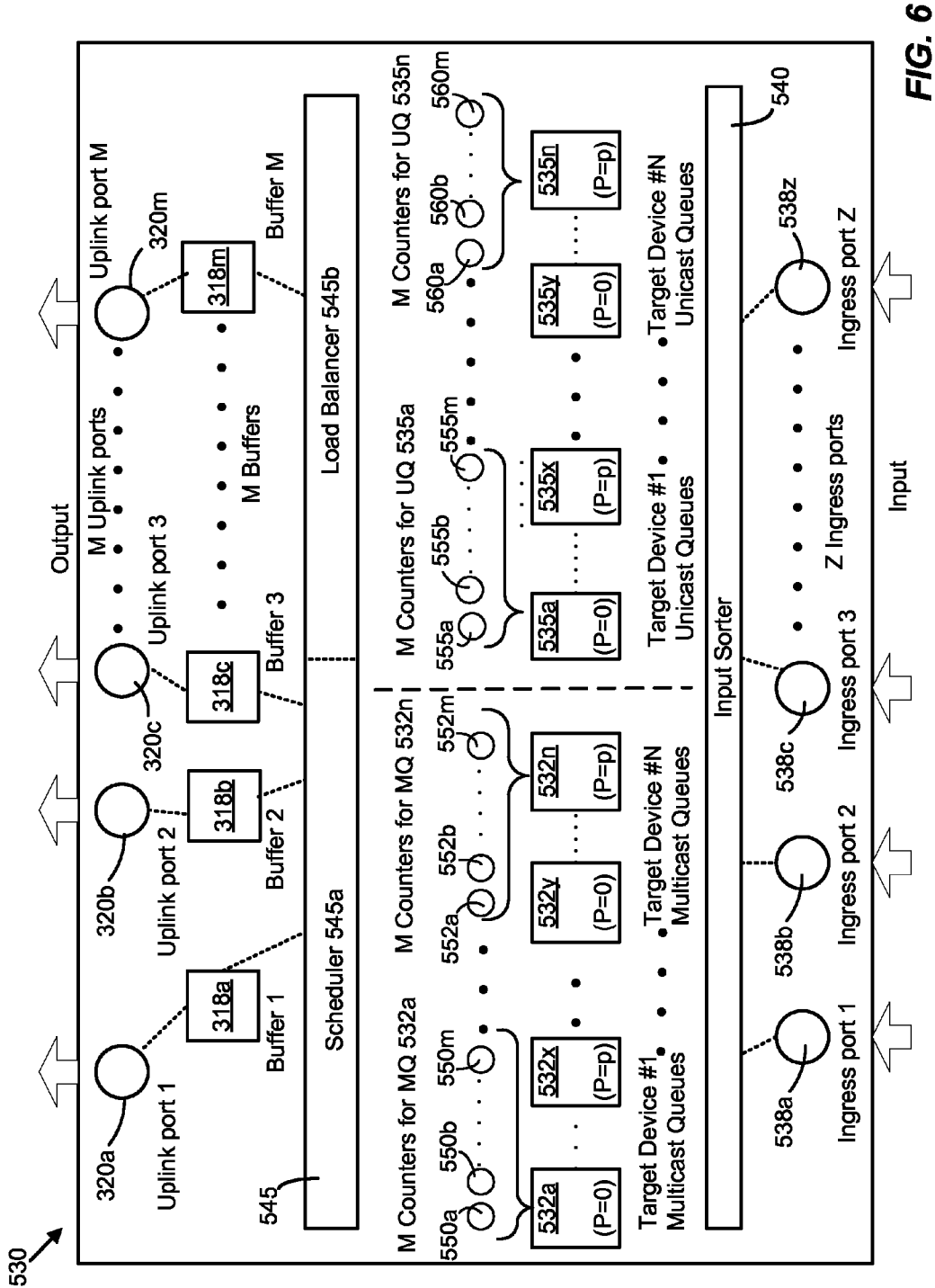
FIG. 6 a block diagram of an example packet processor that services ingress packets at the network switch of FIG. 2 in accordance with an embodiment of the present disclosure.

FIG. 6 is a block diagram of another example ingress packet processor 530 that is utilized in the modular switch or forwarding system 10 of FIG. 1 and/or the forwarding engine 100 of FIG. 2 in accordance with another embodiment of the present disclosure. The packet processor 530 is also referred to as "the load-balancing ingress packet processor 530" or "the ingress packet processor 530". FIG. 6 illustrates processing elements corresponding to processing a packet that ingresses the modular switch. Processing elements corresponding to processing a packet that egresses the modular switch are omitted from FIG. 6 for clarity.

The load-balancing ingress packet processor 530 receives unicast and multicast packets from the network 12 or the network 14, services the packets, and forwards them to the fabric layer 11. The ingress packet processor 530 administers multicast virtual output queues (VoQs) 532a-532x through 532y-532n, where each particular multicast VoQ corresponds both to a particular priority from zero to p and to a particular target device T, T being an integer from 1 to N, and N being a total number of packet processors in the forwarding system 10. The ingress packet processor 530 also administers unicast virtual output queues (VoQs) 535a-535x through 535y-535n, where each particular unicast VoQ corresponds to both a particular priority from zero to p and to a particular target device T. In some embodiments, multiple VoQs corresponding to a same target, a same priority, and a same cast type are utilized. For example, the packet processor 530 includes more than one multicast VoQ 532y corresponding to priority 0 and to target device N, and/or more than one unicast VoQ 535n corresponding to priority p and to target device N, in an embodiment.

Packets arrive at the switch or forwarding system via Z local ingress ports 538a-538z. An input sorter 540 associates each incoming packet with one of the VoQs 532a-532p, 535a-535x through 535y-535n according to the incoming packet's target device, priority and cast type (e.g., multicast or unicast). For unicast packets, the input sorter 540 distributes unicast packets to unicast VoQs 535a-535n in a manner similar to that of the input sorter 310 of FIG. 3. For multicast packets, however, the input sorter 540 of PP 530 determines the target devices to which the incoming multicast packet is to be forwarded, replicates the multicast packet, and places or associates an instance of the replicated multicast packet into a multicast VoQ 532a-532n of a corresponding priority and desired target device. For example, an incoming multicast packet arriving at ingress port 538b with a priority of p and destined for target devices 1 and N is replicated by the input sorter 540 and placed into or associated with multicast VoQs 532x and 532n. In this manner, multicast packets are essentially converted to by the packet processor 530 into a quasi-unicast packet format for forwarding through the modular switch or forwarding system 10.

The packet processor 530 includes the scheduler 30 and the load balancer 32 of FIG. 1, shown respectively by references 545a and 545b in FIG. 3, in an embodiment. Although the scheduler 545a and the load balancer 545b are depicted in FIG. 6 as elements of a single module, in some embodiments, the scheduler and the load balancer are elements of separate, distinct modules within the ingress packet processor 530.

The scheduler 545a obtains packets from the queues 532a-532n and 535a-535n, and places each particular retrieved packet into (or otherwise associates each particular retrieved packet with) a particular buffer 318a-318m. Each buffer 318a-318m corresponds to a respective uplink port 320a-320m communicatively coupled to a respective uplink and crossbar device, such as previously discussed with respect to FIG. 2. The ingress packet processor 530 is in connection with M uplinks, and accordingly, with M crossbar devices.

Figure 7:
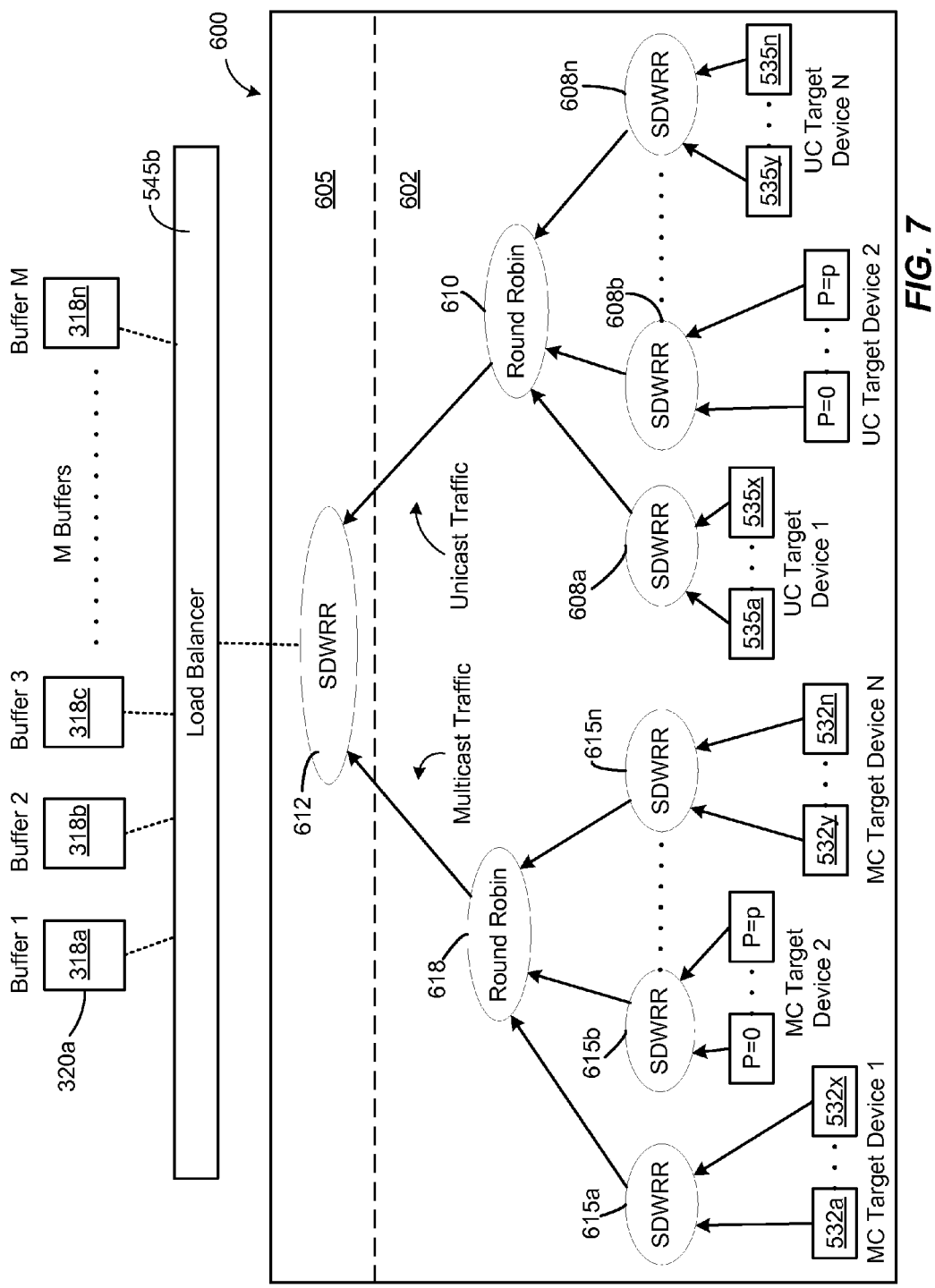
FIG. 7 is a block diagram of an example scheduler of FIG. 6 in accordance with an embodiment of the present disclosure.

As previously discussed, the scheduler 545a selects packets from the VoQs 532a-532n and 535a-535n using a scheduling algorithm. FIG. 7 illustrates an embodiment 600 of a scheduling algorithm used by the scheduler 545a of FIG. 6. For clarity's sake, FIG. 7 is discussed with reference to FIG. 6. FIG. 7 is diagram of an embodiment 600 of the scheduler 545a of FIG. 6 that illustrates an example selection method, and merely for sake of clarity, FIG. 7 is discussed with reference to FIG. 6. In other embodiments, the scheduler 600 is utilized in a packet processor different than the packet processor 530, or the packet processor 530 utilizes a scheduler different than the scheduler 700.

The scheduler 600 includes two stages, a first stage 602 and a second stage 605. The first stage 602 includes several unicast Shaped Deficit Weighed Round Robin (SDWRR) selectors 608a-608n, each corresponding to a different one of the N target devices. Each of the unicast SDWRR selectors 608a-608n includes several inputs to receive signals, corresponding to packets within the corresponding queue, from unicast queues of differing priorities for a same target device, e.g., unicast queues 535a-535x for target device 1, and unicast queues 535y-535n for target device N. Each of the unicast selectors 608a-608n also includes an output coupled to a respective input of a unicast round robin selector 610. The unicast round robin selector 610 selects between the outputs of the unicast SDWRR selectors 608a-608n and provides corresponding signals to an input of a second stage SDWRR selector 612.

For multicast queues, the first stage 602 of the scheduler 545a includes several multicast SDWRR selectors 615a-615n, each corresponding to a different one of the N target devices. Each of the multicast SDWRR selectors 615a-615n includes several inputs to receive signals, corresponding to packets within the corresponding queue, from multicast queues of differing priorities for a same target device, e.g., multicast queues 532a-532x for target device 1, and multicast queues 532y-532n for target device N. Each of the multicast SDWRR selectors 615a-615n also includes an output coupled to a respective input of a multicast round robin selector 618. The multicast round robin selector 618 selects between the outputs of the unicast selectors 615a-615n and provides corresponding signals to the second stage SDWRR selector 612.

The second stage SDWRR selector 612 receives signals from the multicast round robin selector 618 and from the unicast round robin selector 610, selects between the signals in an SDWRR fashion, and outputs corresponding signals to the load balancer 545b of FIG. 6.

In some embodiments of the scheduler 600, instead of a SDWRR algorithm, one or more of the selectors 608a-608n, 610, 612, 615a-615n, 618 utilizes a strict priority (SP) algorithm where packets of a higher priority are always selected before packets of a lower priority. In some embodiments, the selector 610 or the selector 618 utilizes an SDWRR algorithm instead of a round robin algorithm. In other embodiments, the scheduler 600 includes only one stage, omits the schedulers 610 and 618, and/or one or more selectors 608a-608n, 610, 612, 615a-615n, 618 selects based on an algorithm other than SDWRR, SP or round robin.

Referring now to FIGS. 6 and 7, the load balancer 545b receives a selected queue from the selector 612, and selects a buffer to which the load balancer 545b sends at least a portion of next packet in the selected queue (or with which the load balancer 545b associates at least a portion of the next packet in the selected queue) to balance packet traffic amongst the buffers 318a-318m. The load balancer 545b selects a buffer based on a comparison of loads of the uplinks associated with the buffers. For example, in an embodiment, the load balancer 545b selects a buffer based on a comparison of measurements corresponding to uplinks associated with the buffers. For example, in accordance with an embodiment of the present disclosure, the load balancer 545b selects a buffer based on a comparison of measurement values in counters 550a-550m, 552a-552m, 555a-555m, or 558a-558m. Each VoQ 532a-532n and 535a-535n is associated with M counters or indicators that correspond to the M buffers 318a-318m, where each counter provides an indication of a load (e.g., a number of bytes) sent to a respective crossbar. For example, each of the counters 550a-550m, 552a-552m, 555a-555m, and 558a-558m provides a count of a respective number of bytes of packets that are destined to be sent to a particular crossbar and that are of a particular priority.

In other embodiments, other suitable measurements corresponding to the uplinks are utilized by the packet processor 530. For example, the measurements used in selecting an uplink include one or more of throughput measurements, rate of service, error rate, etc. Of course, the selection criteria vary accordingly in these embodiments. For example, if the measurement compared across uplinks is error rate, the load balancer 545b selects an uplink with a lowest error rate or an error rate below a certain error rate threshold, whereas if the compared measurement across uplinks is throughput, the load balancer 545b selects an uplink with a highest throughput or a throughput above a certain throughput threshold. By comparing measurements across uplinks to determine an uplink selection, unicast traffic is more effectively load-balanced across the crossbar devices, at least in some embodiments.

Similarly to as previously discussed with respect to FIG. 3, the ingress packet processor 530 includes a global device identifier that is used as a packet ID in a forwarding tag or packet header, in some embodiments. The packet processor includes a local identifier unique to a packet processor for use as the packet ID, in other embodiments. Also similar to as previously described, an ingress packet processor 530 fragments an uplink packet into smaller transmission units for forwarding to the fabric layer 11, in some embodiments.

Figure 8:
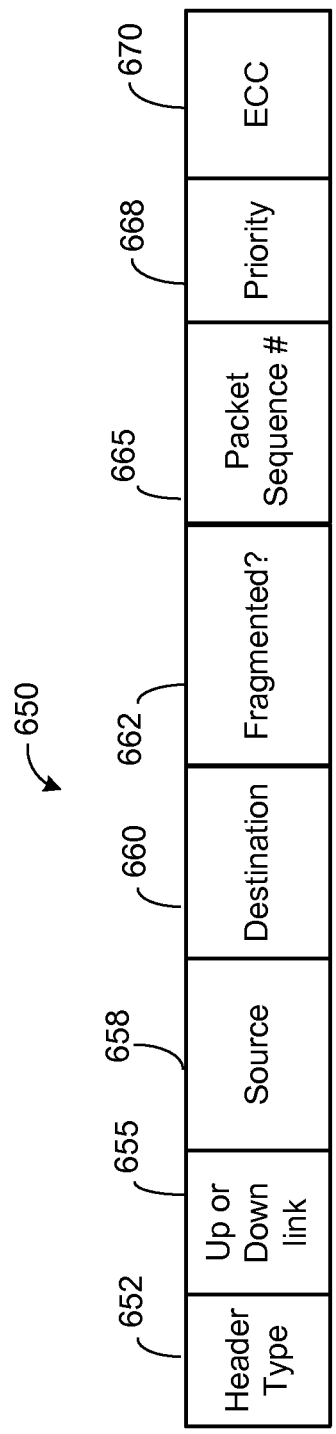
FIG. 8 is a block diagram of an example packet header used in communications of packets between devices in the modular network switch of FIG. 2 in accordance with an embodiment of the present disclosure.

FIG. 8 is a diagram of an example packet header or forwarding tag 650 used to transmit both unicast and multicast packets between devices in the modular network switch of FIG. 2 in accordance with an embodiment of the present disclosure. In an embodiment, the unicast packet header is generated by the packet processor 530 of FIG. 6, and is included in the packet sent from the packet processor 530 using one of the uplink ports 320a-320m to a crossbar or connecting device in the fabric layer 11, e.g., in a uplink transmission, in an embodiment. The same header format 650 is generated by the crossbar device or fabric layer 11 and included with a packet sent from the fabric layer 11 to a target packet processor, e.g., in a downlink transmission, in an embodiment.

Similarly to the header 450 described with respect to FIG. 5A, the header 650 includes a type 652 that indicates whether the packet, transmission unit, or header corresponds to a unicast or multicast packet, and an up or down link indication 655 that corresponds to whether the packet is being transmitted over an uplink to a crossbar or is being transmitted from the crossbar via a downlink to a target packet processor. A source field 658 indicates the source device, and a destination field 660 indicates the target or destination device. For example, the target field 660 includes a packet ID corresponding to a global device identifier of a destination packet processor, or the source field 658 includes a packet ID corresponding to a particular VoQ at a particular source packet processor from which the packet was forwarded, in an embodiment. In another embodiment, the source field 658 includes a packet ID corresponding to a global device identifier of a source packet processor.

The header 650 includes a field 662 that indicates whether the packet is fragmented. If the packet is fragmented, the field 662 indicates if the transmission unit is an initial fragment, a final fragment, or an intermediate fragment, in an embodiment. If the transmission unit is an intermediate fragment, the field 662 indicates a sequence number or order of the particular intermediate fragment within the packet (e.g., a fragment identification, fragment identifier, or fragment ID), in an embodiment, and in other embodiments, the field 662 does not indicate a fragment sequence or fragment ID. Similarly, a packet sequence number field 665 indicates a sequence number or order of the packet within a data flow, in an embodiment. The header 650 includes an indication of a priority 668, such as the priority of the packet, flow, or fabric. The header 650 also includes an error correction/detection code field or similar field 670 to check for and possibly correct any errors.

In one possible implementation of the header 650, the header 650 includes 40 bits, and the number of bits in each of the fields 652-670 is as follows:

Type: 1 bit to indicate unicast or multicast;
Up or Down Link: 1 bit to distinguish uplink or downlink transmission;
Source: 7 bits corresponding to 128 possible packet processors in the modular switch;
Destination: 7 bits corresponding to 128 possible packet processors;
Fragmented: 2 bits that indicate not fragmented, fragmented and initial unit, fragmented and final unit, fragmented and intermediate unit;
Packet Sequence: 13 bits to indicate a sequence of the packet within a data flow;
Priority: 3 bits; and
ECC: 6 bits.

In other embodiments, the number of bits in each field differs from the above example. Furthermore, a unicast header 650 is not limited to the fields 652-670 shown in FIG. 8. In some embodiments, one or more of the fields 652-670 is omitted. In some embodiments, additional suitable fields are added. In some embodiments, the ordering of the fields 652-670 is different than shown in FIG. 8. Of particular note, as the packet processor 530 replicates a multicast packet prior to sending it to the uplinks 320a-320m, only one packet format is needed to service unicast and multicast packets in both the up and down link directions.

Note that for the embodiment described with respect to FIGS. 6-8, multicast packets and unicast packets received at a crossbar device are essentially similar, except for the value of the cast type indicator 852. For both multicast and unicast packets, in an embodiment, the crossbar device merely needs to access the destination field 660 to determine the target device, and does not need to devote any local memory or processing time for table or database lookups in order to determine desired target devices. Additionally, with this embodiment, when mappings of multicast indicators to egress ports change, no database updates are required at the cross bar devices to effectively forward multicast messages, as identification of egress ports and corresponding addresses are provided to the crossbar devices in the uplink multicast headers 650. Furthermore, this embodiment conveniently supports scalability of the modular forwarding system. For instance, when additional packet processors or crossbars are added, the fabric layer 11 does not need to be changed or reconfigured to support multicast routing, as the target device identification and addressing is provided in the headers or forwarding tags.

Figure 9:
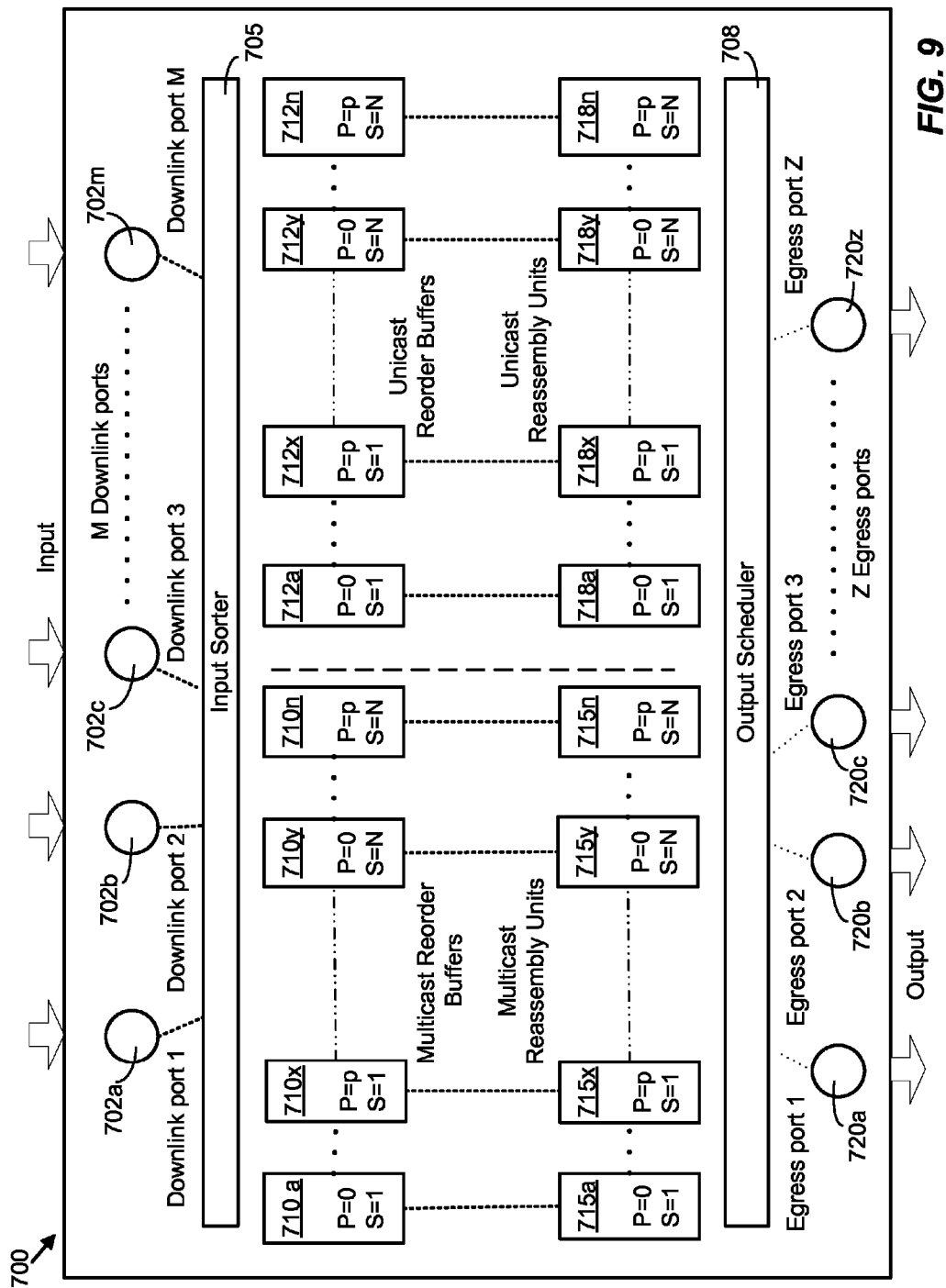
FIG. 9 is a block diagram of an example packet processor that services egress data from the modular network switch of FIG. 2 in accordance with an embodiment of the present disclosure.

FIG. 9 illustrates an embodiment of an example packet processor 700 that services egress data to be transmitted from the modular switch 10 of FIG. 1 and/or the forwarding engine 100 of FIG. 2 to a destination that is external to the modular switch 10. In particular, FIG. 9 illustrates a target device or packet processor 700 that services egress data, including both multicast and unicast packets, that was forwarded by the fabric layer 11 from sending devices or packet processors, such as the ingress packet processor 300 of FIG. 3 or the ingress packet processor 530 of FIG. 6. The packet processor 700 is also referred to as "the egress packet processor 700." FIG. 9 illustrates processing elements corresponding to processing a packet that egresses the modular switch. Processing elements corresponding to processing a packet that ingresses the modular switch are omitted from FIG. 9 for clarity.

The egress packet processor 700 forwards packets from the modular switch or forwarding system 100 to an external network such as the network 12 or the network 14 of FIG. 1, in an embodiment. In particular, the packet processor 700 receives transmission units from the fabric layer 11 via M downlinks at corresponding M downlink ports 702a-702m. In some instances, a received transmission unit corresponds to an entire packet, and in other instances, such as when a packet was fragmented at a sending device, a transmission unit corresponds to a portion of a packet, in an embodiment. The received transmission units are serviced by an input sorter 705. For received transmission units that correspond to an entire packet (e.g., an unfragmented packet), the input sorter 705 sends the transmission unit to an output scheduler 708 (in some embodiments, using a reorder buffer) for transmission to the network (e.g., the network 12 or the network 14). For received transmission units that correspond to fragmented packets, egress packet processor 700 waits for all or most fragments to be received before the egress packet processor 700 attempts to reassemble the packet from its received fragments. When the packet is reassembled, the egress packet processor 700 transmits the reassembled packet to the network 12 or the network 14. Furthermore, the egress packet processor 700 reorders multiple packets in a flow before transmission to the network 12 or the network 14, if necessary.

In a scenario in which received transmission units correspond to fragments of a particular packet, the transmission units, each including a packet fragment, are received at the egress packet processor 700 in a different order from which they were initially sent by the ingress packet processor due to factors such as delays and transit times through the forwarding system 10. The received transmission units corresponding to the particular packet each includes a same packet ID corresponding to a source device. Additionally, in some embodiments, the received transmission units each includes an indication of a fragment identification or identifier (ID) that is separate from, included in, or derivable from the packet ID. The egress packet processor 700 uses the source device's packet ID (and the fragment ID, if available) to reorder and reassemble the packet fragments back into the particular packet, in an embodiment.

In an embodiment, the packet ID in a received transmission unit corresponds to a locally unique ID (e.g., an ID that is unique with regard to the sending device, for example, an ID that corresponds to a particular VoQ of the sending device, but is not unique with respect to all devices in the forwarding system 10, i.e., not globally unique). Based on the packet ID and other information in the header of the received transmission unit, the input sorter 705 sorts the transmission units into a corresponding reorder buffer (e.g., one of the reorder buffers 710a-710x through 710y-710n and 712a-712x through 712y-712n). For example, a particular received transmission unit includes a header such as the header 450, 500, 650, in some embodiments, or some other suitable header, and based on the information included in the header, the input sorter 705 sorts the particular received transmission unit into a corresponding reorder buffer, or otherwise associates the particular received transmission unit with the corresponding reorder buffer. Each reorder buffer 710a-710n and 712a-712n corresponds to a particular priority P where P ranges from zero to a maximum priority p; a particular source device S, where S ranges from one to a maximum number of packet processors N in the forwarding system; and a cast type (e.g., unicast or multicast). In an embodiment, each reorder buffer 710a-710n, 712a-712n is not pre-allocated or perpetuated in memory, but rather is opened upon receipt of a first transmission unit corresponding to a packet from a particular sending device and of a particular priority.

In the embodiment of FIG. 9, the reorder buffers 710a-710n are utilized for multicast packets (e.g., packets that are to be multicast are reordered in the buffers 710a-710n), and the reorder buffers 712a-712n are utilized for unicast packets (e.g., packets that are to be unicast are reordered in the buffers 710a-710n). Each reorder buffer 710a-710n, 712a-712n corresponds to a particular source device (e.g., one of N packet processors) in the modular switch or forwarding system 10, and to a particular priority p. Thus, for each possible source device in the modular switch of forwarding system 10, the egress packet processor 700 includes a different reorder buffer for each possible priority of packet, in an embodiment.

Each of the reorder buffers 710a-710n, 712a-712n receives an initial transmission unit from the packet sorter 705, and then waits for a remainder of transmission units corresponding to the packet (e.g., including other fragments of the packet) to arrive. In an embodiment, each reorder buffer 710a-710n, 712a-712n tracks expected sequence numbers to determine what transmission units have been received and/or are expected. Upon receipt of a pre-determined number of transmission units over a pre-determined amount of time, each reorder buffer 710a-710n, 712a-712n reorders the received transmission units into a packet. In another embodiment, each reorder buffer enters received transmission units into a correctly ordered sequence as the transmission units are received. After each reorder buffer 710a-710n, 712a-712n reorders the transmission units, each reorder buffer 710a-710n, 712a-712n sends the reordered transmission units to a corresponding reassembly unit 715a-715n, 718a-718n.

Reassembly units 715a-715n are utilized for multicast packets (e.g., packets that are to be multicast are reassembled in the units 715a-715n), and reassembly units 718a-718n are utilized for unicast packets (e.g., packets that are to be unicast are reassembled in the units 718a-718n). Similar to the reorder buffers 710a-710n, 712a-712n, each reassembly unit from 715a-715n and 718a-718n corresponds to a particular source device of N packet processors in the modular switch or forwarding system 10, and to a particular priority p. Thus, for each possible source device in the modular switch of forwarding system 10, the egress packet processor 700 includes a reassembly unit for each possible priority. In some embodiments of the egress packet processor 700, a reorder buffer and a corresponding reassembly unit are not separate modules such as shown in FIG. 9, but instead are elements of a single module. For example, in another embodiment, the reorder buffer 710a and the reassembly unit 715a are elements of a single module, and the reorder buffer 712y and the reassembly unit 718y are elements of a single module.

Each reassembly unit 715a-715n, 718a-718n receives reordered transmission units from a corresponding reorder buffer 710a-710n, 712a-712n and reassembles fragmented packets before sending to them to an output scheduler 708. The reassembly begins when a reassembly condition is met, such as when a fragment or portion of a packet (e.g., as identified by a corresponding fragment ID, such as previously discussed) is detected in a transmission unit. In other embodiments, other suitable reassembly conditions are utilized to begin reassembly of a packet.

For at least some embodiments in which the packet ID in a received transmission unit corresponds to a global ID (i.e., an ID that is unique with respect to all packet processors in the modular switch or forwarding system 10), each of the reorder buffers corresponding to different priorities for a particular source as shown in FIG. 9 are replaced by a single reorder buffer. For example, the reorder buffers 710a-710x are replaced by a single reorder buffer corresponding to source device 1, the reorder buffers 710y-710n are replaced by a single reorder buffer corresponding to source device N, and so on. With this configuration, different priorities of packets are distinguished within each single reorder buffer. Similarly, each group of reassembly units corresponding to different priorities for the particular source device (e.g., reassembly unit groups 715a-715x, 715y-715n, 718a-718x, and 718y-718n) are replaced by a single reassembly unit, and the single reassembly units corresponding to each source device deliver reassembled packets to the output scheduler 708, in an embodiment.

The output scheduler 708 receives the reassembled packet, and schedules it for transmission from the egress packet processor 700 via one of the ports 720a-720z. In an embodiment, packets queued for transmission at each of the ports 720a-720z are forwarded from the egress packet processor 700 via a round robin algorithm, although other suitable algorithms are utilized in other embodiments.

In at least some embodiments, the techniques described herein achieve average load-balancing within the forwarding system 10, and additionally require significantly less memory at egress devices as compared to currently known techniques.

With currently known techniques, for example, reorder buffers at egress devices must be maximally-sized for worst case scenarios to account for delays throughout the system due to load imbalance and other factors. However, with the techniques described herein, in at least some embodiments, the improvement in average load balancing achieves, for example, a three-fold reduction in a worst case reorder buffer rebound, as detailed below.

Consider a forwarding system with N packet processors and M crossbar devices that uses the techniques described herein. For ease of explanation, assume only unicast packets of variable length and a same priority are forwarded through the network switch and are destined for target j. Each queue in a packet processor is associated with M counters. When a VoQ is chosen, the packet processor forwards a packet from the VoQ towards a link buffer corresponding to a counter that has a minimum value, and the respective counter is incremented by the number of bytes that are transmitted. By using at least this technique, average load-balancing is achieved across link buffers and crossbars. In particular, the difference between any two link buffers is at most one maximal packet length.

Furthermore, as a result of the improvement in average load balancing using the techniques described herein, at least in some embodiments, a maximum, total reorder buffer memory size required at a target device is decreased by an order of three as compared to currently known systems. In a particular, an upper bound reorder buffer size RB to service packets forwarded from a particular source device in a modular switch is determined to be:

$$RB = O(MN) = (M-1)[2N(D_{max}/D_{min})], \qquad (Eq. 1)$$

where Dmax is a transmission time of a maximal packet length Lmax, and Dmin is a transmission time of a minimal packet length Lmin. Assume a timeout T=2N*Dmax for waiting for a packet that was received in the incorrect order. Accounting for the timeout T, for multiple source devices, and for a buffer-based memory management scheme used in the reorder buffer, a worst case total reorder buffer size is determined to be proportional to:

$$O(2CMN), \qquad (Eq. 2)$$

where C=(Lmax/Lmin) memory cells for unicast and multicast packets. In an example, if each cell has 13 bits for a packet ID, 14 bits for a buffer, 10 bits for a next pointer, and 6 bits for ECC, then 6B of memory are required for each cell. Thus, for this example, the upper bound of memory needed for a single reorder buffer corresponding to unicast packets received from a single source device is proportional to:

$$2CMN6B. \qquad (Eq. 3)$$

Currently, multicast packets are identified in the art using {source device and VIDX (Virtual Local Area Network Index)}, where VIDX is a multicast-target group index (e.g., an index indicating a list of physical ports to which the packet should be replicated). Thus, for multicast flows, based on a typical length of a VIDX, 8 k entries are possible. Accordingly, the maximum, context memory size upper bound for unicast and multicast packets using currently known techniques is represented by the expression:

$$8K2CN6B + 2CNM6B. \qquad (Eq. 4)$$

However, with the techniques of the present disclosure, at least in some embodiments, both unicast and multicast packets are similarly identified in the reorder buffer. Thus, the total reorder buffer memory for unicast and multicast packets under the techniques described herein is 8K, which is at least a reduction of context memory size by a magnitude of three orders as compared with currently known techniques.

Next, several example methods for implementing the techniques described herein are discussed with reference to flow diagrams of FIGS. 10-12.

Figure 10:
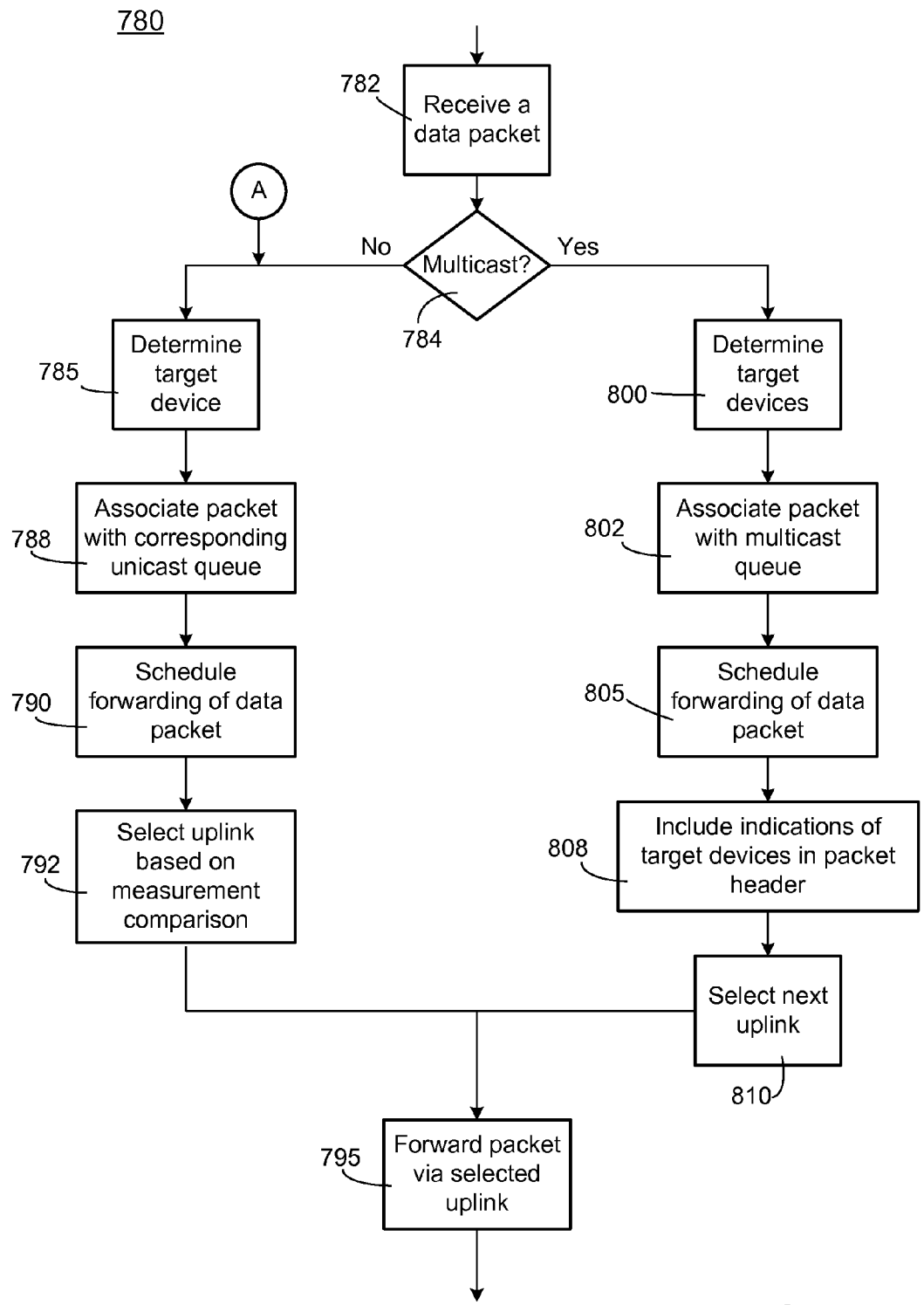
FIG. 10 is a flow diagram of an example method for load balancing network traffic in a modular forwarding system in accordance with an embodiment of the present disclosure.

FIG. 10 is a flow diagram of an example method 780 for load balancing network traffic in a modular forwarding system in accordance with an embodiment of the present disclosure. In one embodiment, the method 780 is implemented by the packet processor 300 of FIG. 3, the scheduler 400 of FIG. 4, and the fields and headers of FIGS. 5A-5C are utilized. FIG. 10 is described with reference to FIGS. 2, 3 and 4 for ease of explanation. But in other embodiments, the method 780 is implemented by another suitable packet processor, by another suitable forwarding system, and/or with other suitable headers.

At block 782, a data packet is received. For example, the data packet is received at the ingress packet processor 300. At block 784, the cast type of the received data packet is determined.

If the received packet is determined at block 784 to have a cast type of "unicast," a target device for the packet is determined at block 785. The packet is associated with a unicast queue that corresponds to the priority of the packet and to the target device (block 788). For example, at least a portion of the packet contents are entered into the unicast queue, or a descriptor, reference, pointer, or other suitable information corresponding to the packet is entered into the unicast queue.

At block 790, forwarding of the data packet is scheduled. At block 792, an uplink is selected based on a comparison of loads of traffic serviced by respective uplinks or respective measurements corresponding to respective uplinks between the source device 300 and the connecting devices of the fabric layer 11. For example, in one embodiment, a measurement of an amount of data (e.g., a number of bytes) that has been sent over each uplink to respective connecting devices is compared, and block 792 determines a particular uplink to which the least amount of data has been sent. In another embodiment, block 792 determines one of several uplinks whose corresponding measurement of sent data (e.g., a number of bytes) is less than that of other uplinks. In another embodiment, block 792 compares measurements corresponding to an amount of data (e.g., a number of bytes) that was placed into or associated with each of the buffers corresponding to the uplinks (e.g., buffers 318a-318n). In other embodiments, other measurements corresponding to the plurality of uplinks to the fabric layer 11 are alternatively or additionally used to select an uplink.

At block 795, information corresponding to the data packet is forwarded from the unicast queue to the selected uplink. The information corresponding to the data packet is then forwarded from the selected uplink to a corresponding cross bar in a transmission unit that includes a header or forwarding tag identifying the transmission unit as a unicast packet and including a packet ID, in an embodiment. In some embodiments, a single transmission unit includes an entire payload for the packet, and in some embodiments, the payload of the packet is fragmented across multiple transmission units.

If, at block 784, the packet is determined to be a multicast packet, at block 800, a plurality of target devices to which the data packet is to be forwarded is determined. In one embodiment, the blocks 800 through 810 are performed by an ingress packet processor, such as the packet processor 300 of FIG. 3.

At block 802, the packet is associated with a multicast queue (e.g., one of multicast queues 302a-302p of the packet processor 300 of FIG. 3) that corresponds to the priority of the packet. For example, at least a portion of the data payload of the packet is included in the multicast queue, and/or a descriptor, reference, pointer or other information associated with the packet is included in the multicast queue. At block 805, the forwarding of the multicast data packet is scheduled, and at block 808, indications of the target devices to which the multicast data packet is intended to be sent are included in a header of a transmission unit corresponding to the data packet. For example, the packet IDs of the target devices are included in the header of a transmission unit that includes some or all of the information associated with the packet.

At block 810, an uplink is selected based on a comparison of respective measurements corresponding to respective uplinks. For example, an uplink is selected based on a randomly uniform distribution. In some embodiments, the uplink is selected from a group of link buffers that have sufficient room to accommodate the next packet or packet fragment. In other embodiments, other suitable methods of selecting an uplink 810 based on a comparison of measurements are used.

At block 795, information corresponding to the data packet is forwarded from the multicast queue to the selected uplink. The information corresponding to the data packet is then forwarded from the selected uplink to a corresponding cross bar in a transmission unit that includes the header or forwarding tag of block 808. In some embodiments, a single transmission unit includes an entire payload for the packet, and in some embodiments, the payload of the packet is fragmented across multiple transmission units.

Figure 11:
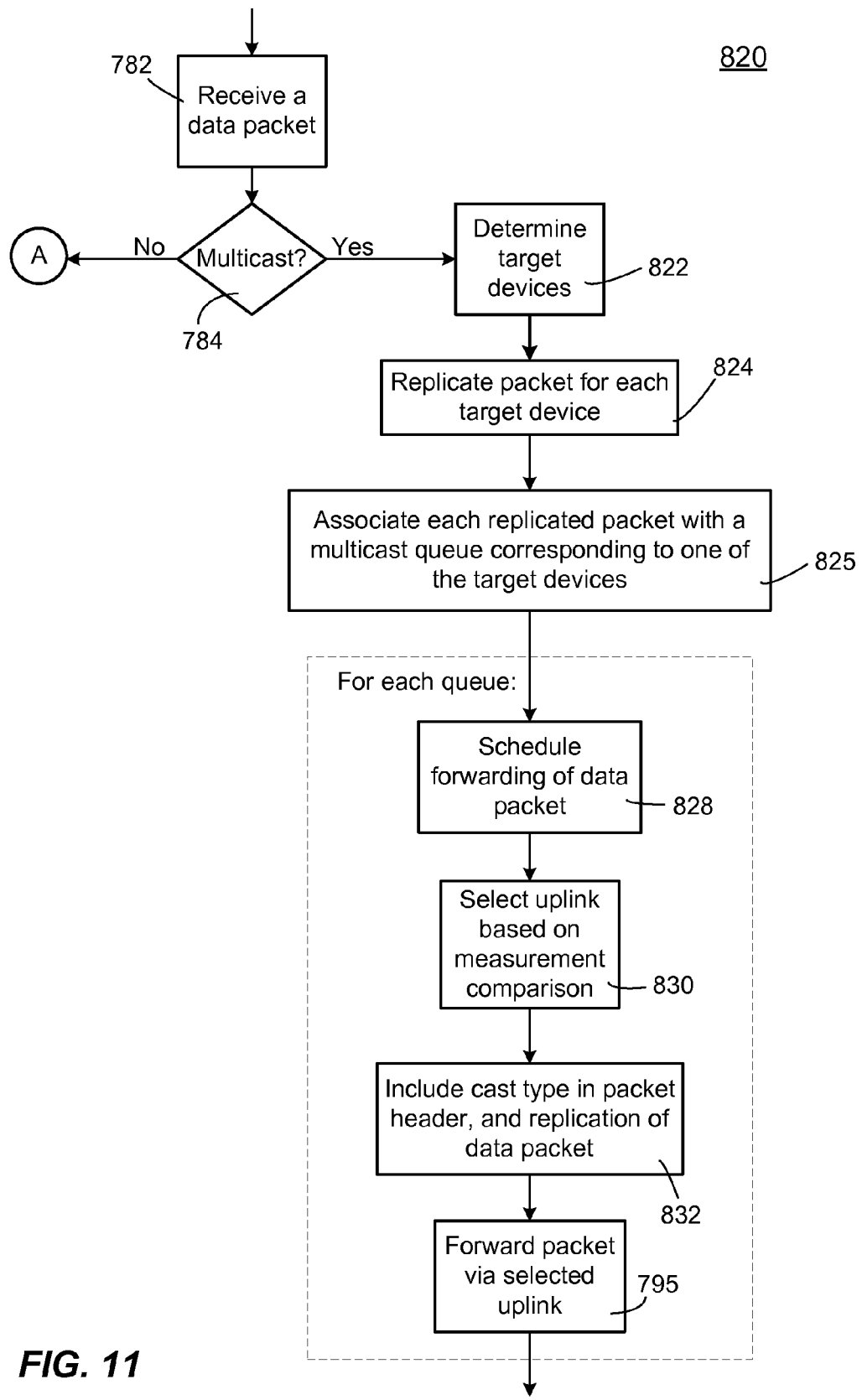
FIG. 11 is a flow diagram of an example method for load balancing multicast network traffic in a modular forwarding system in accordance with an embodiment of the present disclosure.

Turning now to FIG. 11, a method 820 for load balancing multicast network traffic in a modular forwarding system in accordance with an embodiment of the present disclosure is illustrated. In some embodiments, the method 820 operates in conjunction with the packet processor 530 of FIG. 6, the scheduler 600 of FIG. 7, and/or the header 650 of FIG. 8. In other embodiments, the method 820 is implemented by another suitable packet processor and/or scheduler, and/or in conjunction with another suitable header.

In the method 820, packets determined to have a cast type of "unicast" are handled similarly as in the method 780 of FIG. 10. That is, a packet is received at block 782, and if the packet is determined to be unicast at block 784, the method 820 flows from connector A of FIG. 11 to connector A of FIG. 10 to forward the unicast packet through the modular switch.

If a packet, however, is determined to have a cast type of "multicast" at block 784, the set of target devices to which the multicast packet is desired to be sent is determined at block 822. At block 824, the packet (or information associated with the packet, e.g., a descriptor, header, etc.) is replicated, and at block 825, each instance of the replicated packet is associated with a different multicast queue corresponding to one of the set of target devices and to a corresponding priority. For example, at least a portion of the data payload of the replicated packet is included in each multicast queue, or a descriptor, reference, pointer, etc., is included in each multicast queue.

Each multicast queue is serviced independently using the blocks 828-832 and 795. At block 828, the forwarding of the multicast data packet is scheduled, and at block 830, an uplink is selected based on the traffic loads serviced at respective crossbars. In an embodiment, an uplink is selected based on a comparison of respective measurements corresponding to respective uplinks or respective crossbars. For example, a measurement of an amount of data (e.g., a number of bytes) sent by each multicast queue over each uplink to a respective crossbar is compared, and block 830 selects a particular uplink corresponding to a particular crossbar to which the least amount of data has been sent for the respective priority.

In another embodiment, block 830 determines or selects one of several uplinks whose corresponding measurement of sent data (e.g., a number of bytes sent to a respective crossbar using a respective uplink) is less than that of other uplinks. In other embodiments, other suitable measurements are alternatively or additionally compared to select an uplink.

At block 832, a header of a transmission unit that includes at least a portion of the information associated with the packet from the multicast queue is generated. The header includes an indication of the cast type, and an indication of one of the target devices. At block 795, the transmission unit is sent from each multicast queue to the determined uplink. In some embodiment, the entire payload of the data packet is included in a single transmission unit, and in other embodiments, the payload of the data packet is fragmented across multiple transmission units.

In one embodiment, the blocks 822 through 832 and 795 corresponding to processing multicast data packets are performed by an ingress packet processor, such as the packet processor 530 of FIG. 6. In another embodiment, the blocks 822 through 832 and 795 are implemented by another suitable ingress packet processor.

Figure 12:
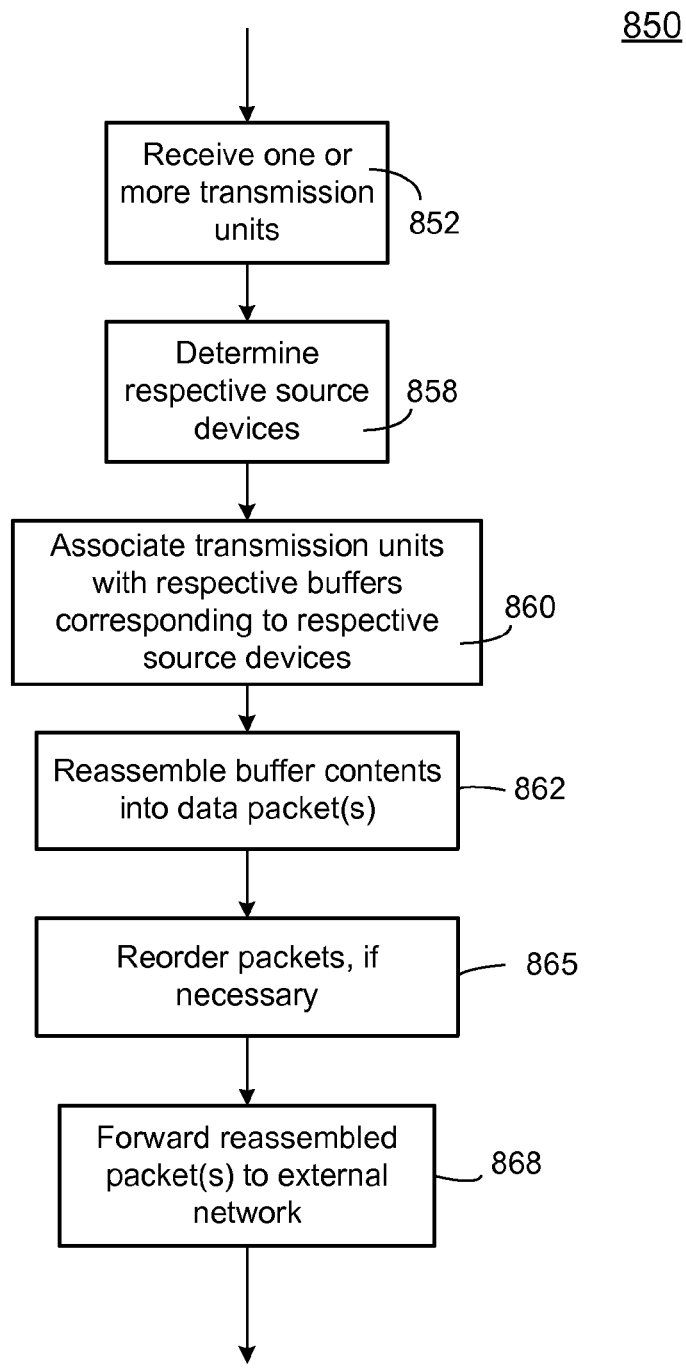
FIG. 12 is a flow diagram of an example method for processing network traffic in a modular forwarding system in accordance with an embodiment of the present disclosure.

FIG. 12 is a flow diagram of an example method 850 for processing network traffic in a modular forwarding system in accordance with an embodiment of the present disclosure. In one embodiment, the method 850 is implemented by the egress packet processor 700 of FIG. 9. In other embodiments, the method 850 is implemented by another suitable egress packet processor.

At block 852, one or more transmission units are received. For example, the one or more transmission units are received over one or more downlinks connected to crossbar devices in a fabric layer, in an embodiment. For each received transmission unit, a source device from which the transmission unit was forwarded is determined at block 858. For example, in one embodiment, the source device is determined from the field 458 of a unicast header 450 depicted in FIG. 5A. In another embodiment, the source device is determined based on the source field 508 of the downlink header 500 depicted in FIG. 5D, and in another embodiment, the source device is determined based on the source field 658 of FIG. 8. At block 860, each transmission unit is associated with or placed into a buffer corresponding to the source device. In some embodiments, the buffer also corresponds to a priority and/or to a cast type. The buffer is, for example, a reorder buffer in an embodiment.

At block 862, buffer contents are reassembled into corresponding data packets. For example, buffer contents are reassembled based on received fragment IDs, such as previously discussed. At block 865, packets are reordered if necessary, for example, based on received packet IDs in a manner such as previously discussed. At block 868, reassembled packets are forwarded to a network or destination external to the forwarding system.

As previously discussed, at least some of the various blocks, operations, and techniques described above may be implemented in hardware, a processor executing firmware and/or software instructions, or any combination thereof. When implemented in firmware and/or software, the firmware and/or software instructions may be stored in any computer readable or machine readable memory such as on a magnetic disk, an optical disk, or other tangible storage medium, in a RAM or ROM or flash memory, processor, hard disk drive, optical disk drive, tape drive, etc. The software or firmware instructions may include computer readable or machine readable instructions stored on a memory of one or more computer readable or machine readable storage media that, when executed by the processor, cause the processor to perform various acts. When implemented in hardware, the hardware may comprise one or more of discrete components, an integrated circuit, an application-specific integrated circuit, etc.

From the foregoing, it is noted that one example method for processing network traffic in a modular switching device includes receiving a communication unit at a source device, where the communication unit is associated with a unique communication unit identifier; dividing the communication unit into a plurality of transmission units, where each of the plurality of transmission units includes a position identifier indicative of a position of the transmission unit within the communication unit and the communication unit identifier; and causing the plurality of transmission units to be transmitted in parallel to respective ones of a plurality of connecting devices, where each of the plurality of connecting devices connects the source device to the target. In an embodiment, each of the plurality of transmission units further includes at least one of a first flag that indicates that the transmission unit is the first transmission unit in the communication unit, and a second flag that indicates that the transmission unit is the last transmission unit in the communication unit. In an embodiment, the communication unit is associated with a particular type of traffic such as a class of service, a traffic class, or one of a plurality of priority levels.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of load balancing network traffic in a modular switch that includes a source line card, a target line card, and a plurality of fabric cards mounted in a chassis, the method comprising:
    determining, using the source line card of the modular switch and mounted in the chassis, a particular uplink from a plurality of uplinks connecting the source line card to the plurality of fabric cards of the modular switch and mounted in the chassis, the determining based on a comparison of respective measurements corresponding to respective uplinks of the plurality of uplinks, and each measurement indicative of a load of the respective uplink; and
    causing at least a portion of a data packet to be forwarded, by a forwarding engine of the modular switch, from the source line card of the modular switch and mounted in the chassis to the target line card of the modular switch and mounted in the chassis using the particular uplink and a corresponding fabric card of the plurality of fabric cards of the modular switch and mounted in the chassis.

2. The method of claim 1, wherein determining based on the comparison of the respective measurements indicative of the respective loads of the respective uplinks comprises determining based on a comparison of respective measurements indicative of respective number of bytes that are transmitted using the respective uplinks to the plurality of fabric cards.

3. The method of claim 1, wherein determining the particular uplink based on the comparison of the respective measurements indicative of the respective loads of the respective uplinks comprises determining the particular uplink based on a comparison of respective amounts of data sent to the respective uplinks.

4. The method of claim 3, wherein determining the particular uplink based on the comparison of the respective amounts of data sent to the respective uplinks comprises determining that an amount of data sent to the particular uplink is less than an amount of data sent to at least one other uplink of the plurality of uplinks.

5. The method of claim 4, wherein determining that the amount of data sent to the particular uplink is less than the amount of data sent to the at least one other uplink of the plurality of uplinks comprises determining that the amount of data sent to the particular uplink is less than respective amounts of data sent to all other uplinks of the plurality of uplinks.

6. The method of claim 1, wherein causing the at least the portion of the data packet to be forwarded from the source line card to the target line card comprises:
    including a fragment of the data packet and an identifier corresponding to the data packet (packet ID) in a transmission unit; and
    forwarding the transmission unit from the source line card to the target line card.

7. The method of claim 6, wherein including the packet ID comprises at least one of:
    including an identifier of the target line card, or
    including an identifier of a portion of a memory accessible by the source line card and that stores data corresponding to the data packet.

8. The method of claim 6, wherein the transmission unit is one of a plurality of transmission units, and wherein the method further comprises:
    dividing the data packet into fragments; and
    including the packet ID and a different fragment in each of the plurality of transmission units;
    for each of the plurality of transmission units, determining a selected uplink based on the comparison of the respective measurements of the respective uplinks; and
    causing each of the plurality of transmission units to be forwarded from the source line card to the target line card using the selected uplink.

9. The method of claim 1, wherein the data packet is a first data packet, the particular uplink is a first particular uplink, and the at least a portion of the first data packet is included in a first transmission unit to be forwarded from the source line card to the target line card, and the method further comprises:
    including at least a portion of a second data packet in a second transmission unit, the second transmission unit being of a different size than the first transmission unit; and
    causing the second transmission unit to be forwarded from the source line card to the target line card using a second particular uplink.

* * * * *